United States Patent
Miyamoto

(10) Patent No.: US 9,570,935 B2
(45) Date of Patent: Feb. 14, 2017

(54) MAGNETIC COUPLING UNIT AND MAGNETIC COUPLING SYSTEM

(71) Applicant: SONY CORPORATION, Tokyo (JP)

(72) Inventor: Takashi Miyamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 1055 days.

(21) Appl. No.: 13/661,939

(22) Filed: Oct. 26, 2012

(65) Prior Publication Data

US 2013/0113297 A1    May 9, 2013

(30) Foreign Application Priority Data

Nov. 8, 2011   (JP) .................................. 2011-244319

(51) Int. Cl.
*H02J 17/00*   (2006.01)
*H02J 7/02*    (2016.01)
*H01F 38/14*   (2006.01)

(52) U.S. Cl.
CPC .............. *H02J 7/025* (2013.01); *H01F 38/14* (2013.01); *H02J 50/50* (2016.02)

(58) Field of Classification Search
None
See application file for complete search history.

(56) References Cited

U.S. PATENT DOCUMENTS

| | | | |
|---|---|---|---|
| 3,774,739 A * | 11/1973 | Higuchi .................. | 192/84.941 |
| 8,614,526 B2 * | 12/2013 | Cook et al. ................... | 307/104 |
| 2009/0116681 A1 * | 5/2009 | Sadaie et al. ................ | 381/401 |
| 2010/0036773 A1 * | 2/2010 | Bennett .......................... | 705/67 |
| 2010/0201316 A1 * | 8/2010 | Takada et al. ................ | 320/108 |
| 2010/0219833 A1 * | 9/2010 | McGinley et al. ........... | 324/318 |
| 2011/0210617 A1 * | 9/2011 | Randall ........................ | 307/104 |
| 2012/0235502 A1 * | 9/2012 | Kesler ..................... | H03H 7/40 |
| | | | 307/104 |

FOREIGN PATENT DOCUMENTS

| | | |
|---|---|---|
| JP | 2004-267466 | 9/2004 |
| JP | 2006-178713 | 7/2006 |
| JP | 2010-093180 | 4/2010 |

* cited by examiner

*Primary Examiner* — Rexford Barnie
*Assistant Examiner* — Terrence Willoughby
(74) *Attorney, Agent, or Firm* — Chip Law Group

(57) ABSTRACT

There are provided a magnetic coupling unit and a magnetic coupling system which are capable of reducing energy loss when operations using magnetic coupling between magnetic devices are performed. The magnetic coupling unit includes: one or more magnetic devices each capable of being magnetically coupled with other magnetic device in other unit; and one or more coupling reinforcing sections each reinforcing the magnetic coupling.

17 Claims, 21 Drawing Sheets

| CURRENT GENERATION SECTION 31 | CURRENT GENERATION SECTION 32 | MAXIMUM TRANSMISSION EFFICIENCY (%) |
|---|---|---|
| NONE | NONE | 53.6 |
| OPEN COIL | OPEN LOOP | 60.6 |
| OPEN LOOP | OPEN COIL | 66.2 |
| OPEN LOOP | OPEN LOOP | 72.1 |
| OPEN COIL | OPEN COIL | 79.4 |

| CURRENT GENERATION SECTION 31 | CURRENT GENERATION SECTION 32 | MAXIMUM TRANSMISSION EFFICIENCY (%) |
|---|---|---|
| NONE | NONE | 53.6 |
| OPEN COIL | OPEN LOOP | 55.6 |
| OPEN LOOP | OPEN COIL | 66.3 |
| OPEM LOOP | OPEN LOOP | 71.2 |
| OPEN COIL | OPEN COIL | 78.9 |

| RESONANCE FREQUENCY f3 OF COUPLING REINFORCING SECTION 3B | MAXIMUM TRANSMISSION EFFICIENCY (%) |
|---|---|
| NO RESONANCE | 79.4 |
| THREE TIMES OF RESONANCE FREQUENCY f1(f2) (f3=3×f1) | 83.8 |
| TWO TIMES OF RESONANCE FREQUENCY f1(f2) (f3=2×f1) | 89.1 |

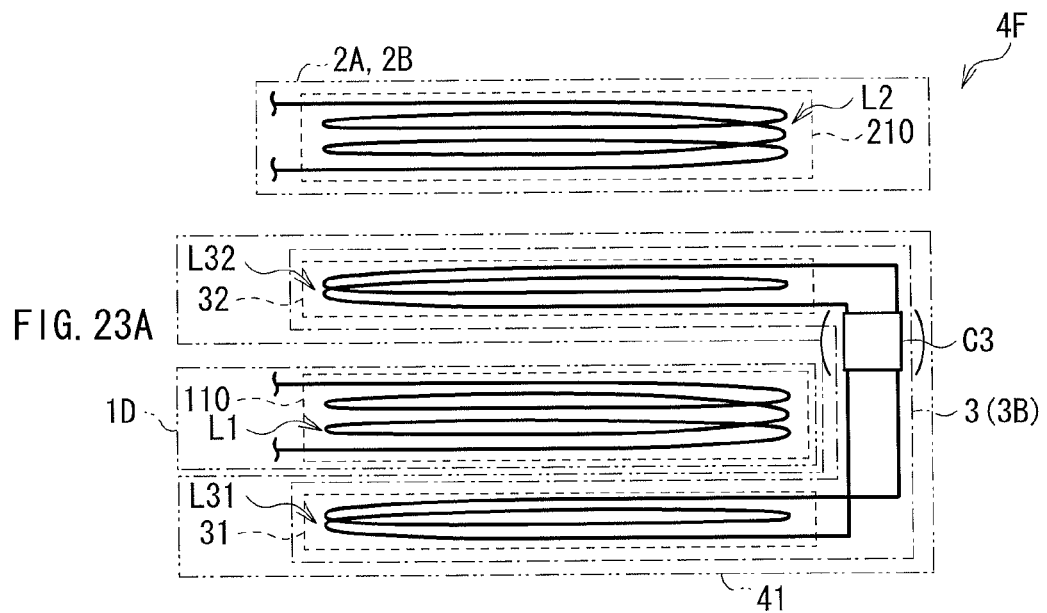
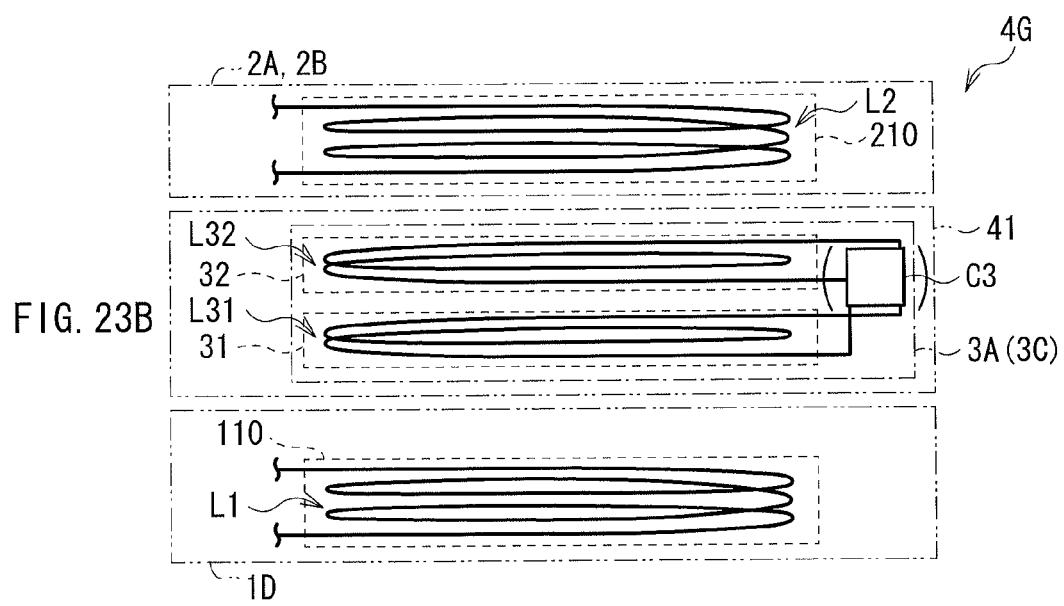

MAGNETIC COUPLING UNIT AND MAGNETIC COUPLING SYSTEM

BACKGROUND

This disclosure relates to a magnetic coupling unit having a magnetic device such as a coil, and to a magnetic coupling system including a plurality of such magnetic coupling units.

In recent years, a feed system (a non-contact feed system, a wireless charging system) performing non-contact power supply (power transmission) to CE devices (consumer electronics devices) such as mobile phones and mobile music players has attracted attention. Accordingly, charging is allowed to be started by not inserting (connecting) a connector of a power supply such as an AC adapter into a unit but placing an electronic unit (a secondary-side unit) on a charging tray (a primary-side unit). In other words, terminal connection between the electronic unit and the charging tray is not necessary.

As a method of performing non-contact power supply in such a way, an electromagnetic induction method (for example, Japanese Unexamined Patent Application Publication No. 2010-93180) is well known. In addition, a non-contact feed system using a so-called magnetic resonance method which uses magnetic resonance phenomenon has attracted attention. In the non-contact feed system using the magnetic resonance method, power transmission is achievable with a distance larger than that in the electromagnetic induction method because of a principle of the magnetic resonance phenomenon. In addition, transmission efficiency (feeding efficiency) is less likely to be degraded even if an axial alignment is not enough. Incidentally, in the magnetic resonance method and in the electromagnetic induction method, the non-contact feed system uses the magnetic coupling between a feed source (a power transmission coil) and a feed destination (a power reception coil).

On the other hand, similarly to the non-contact feed system, there are a large number of systems (magnetic coupling systems) performing a predetermined operation with use of magnetic coupling between coils (magnetic devices). Examples of such systems include a wireless communication system performing local wireless communication between an electronic unit and a non-contact integrated circuit (IC) card (for example, Japanese Unexamined Patent Application Publication No. 2006-178713) and a transformation system converting a voltage value of an AC power into a different voltage value. In addition, examples of such systems further include an induction heating system heating a metal product (for example, a metal pot) without contact with use of magnetic coupling between a coil and the metal product (for example, Japanese Unexamined Patent Application Publication No. 2004-267466).

SUMMARY

Incidentally, in the non-contact feed system, the wireless communication system, and the like, improvement of transmission efficiency (feeding efficiency) between coils is demanded. In addition, improvement of heating efficiency is demanded in the induction heating system, and reduction of insertion loss of a transformer which is an electronic component is demanded in the transformation system. In other words, in these systems (the magnetic coupling systems), reduction of energy loss is desired.

It is desirable to provide a magnetic coupling unit and a magnetic coupling system which are capable of reducing energy loss when operations using magnetic coupling between magnetic devices are performed.

According to an embodiment of the disclosure, there is provided a magnetic coupling unit including: one or more magnetic devices each capable of being magnetically coupled with other magnetic device in other unit; and one or more coupling reinforcing sections each reinforcing the magnetic coupling.

According to an embodiment of the disclosure, there is provided a magnetic coupling system including a plurality of magnetic coupling units, each of the magnetic coupling units including one or more magnetic devices. The magnetic device in one of the magnetic coupling units is allowed to be magnetically coupled with the magnetic device in one of the remaining magnetic coupling units, and one or more coupling reinforcing sections each reinforcing the magnetic coupling are provided in one or more of the magnetic coupling units and other unit, the other unit being separated from the magnetic coupling units.

In the magnetic coupling unit and the magnetic coupling system according to the embodiments of the disclosure, the coupling reinforcing section reinforcing the magnetic coupling between the magnetic devices in different units is provided. As a result, the magnetic coupling between the magnetic devices is enhanced.

In the magnetic coupling unit and the magnetic coupling system according to the embodiments of the disclosure, the coupling reinforcing section reinforcing the magnetic coupling between the magnetic devices in different units is provided. Accordingly, the magnetic coupling between the magnetic devices is enhanced. As a result, energy loss is allowed to be reduced when operations using the magnetic coupling between the magnetic devices are performed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 23A and 23B are schematic diagrams each illustrating a schematic configuration example of still another feed system according to the modification.

DETAILED DESCRIPTION

Hereinafter, preferred embodiments of the disclosure will be described in detail with reference to drawings. Note that the descriptions will be given in the following order.
1. First embodiment (a first example of a non-contact feed system including a coupling reinforcing section in a primary-side unit)
2. Second embodiment (a second example of the non-contact feed system including the coupling reinforcing section in the primary-side unit)
3. Third embodiment (a third example of the non-contact feed system including the coupling reinforcing section in the primary-side unit)
4. Modifications (examples of a non-contact feed system including a coupling reinforcing section in a secondary-side unit or other units)
5. Other modifications (examples of a magnetic coupling system other than a non-contact feed system)

[First Embodiment]
[General Configuration of Feed System 4]

Figure 1:
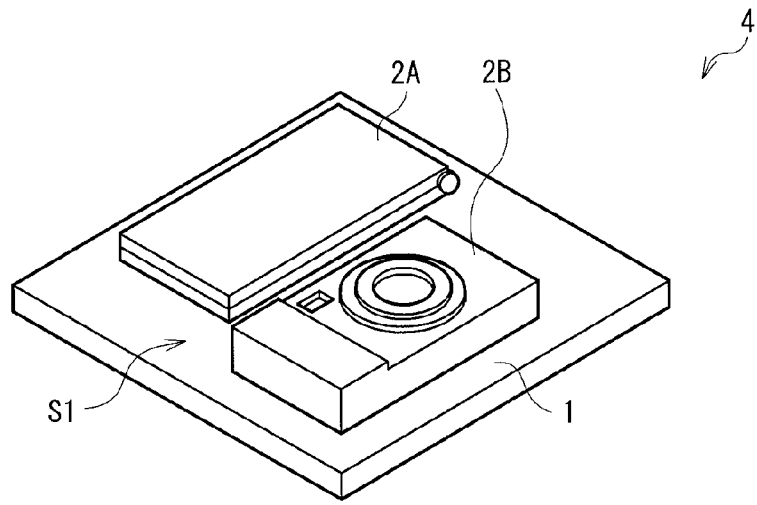
FIG. 1 is a perspective view illustrating an example of an appearance configuration of a feed system (a magnetic coupling system) according to a first embodiment of the disclosure.
Figure 2:
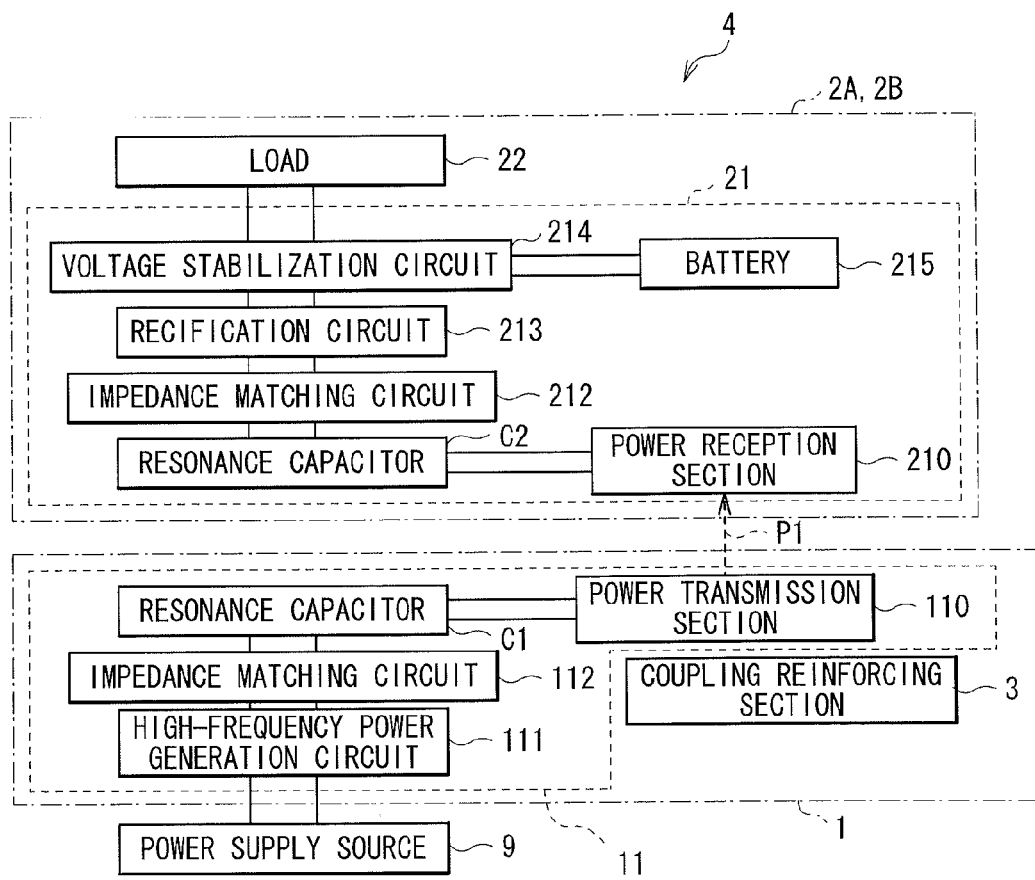
FIG. 2 is a block diagram illustrating a detailed configuration example of the feed system illustrated in FIG. 1.

FIG. 1 illustrates an example of an appearance configuration of a feed system (a feed system 4) as a magnetic coupling system according to a first embodiment of the disclosure. FIG. 2 illustrates a block configuration example of the feed system 4. The feed system 4 is a system (a non-contact feed system) performing non-contact power transmission (power supply, or power feeding) with use of a magnetic field (with use of magnetic resonance and the like, hereinafter the same). The feed system 4 includes a feed unit 1 (a primary-side unit) and one or more electronic units (herein, two electronic units 2A and 2B, secondary-side units) as units to be fed with power.

As illustrated in FIG. 1, for example, in the feed system 4, the electronic units 2A and 2B are placed (or closely disposed) on a feeding surface (a power transmission surface) S1 of the feed unit 1 so that the feed unit 1 transmits power to the electronic units 2A and 2B. In this case, in consideration of the case where power is transmitted to the plurality of electronic units 2A and 2B at the same time or in a time-divisional manner (sequentially), the feed unit 1 has a mat shape (a tray shape) in which an area of the feeding surface S1 is larger than the size of the electronic units 2A and 2B to be fed with power.

(Feed Unit 1)

The feed unit 1 is a unit (a charging tray) transmitting power to the electronic units 2A and 2B with use of a magnetic field, as described above. As illustrated in FIG. 2, for example, the feed unit 1 includes a power transmission unit 11 and a coupling reinforcing section 3. The power transmission unit 11 includes a power transmission section 110, a high-frequency power generation circuit 111, an impedance matching circuit 112, and a resonance capacitor C1.

The power transmission section 110 includes, as a magnetic device, a power transmission coil (a primary-side coil) L1 and the like which will described later. The power transmission section 110 uses the power transmission coil L1 and the resonance capacitor C1 to transmit power to the electronic units 2A and 2B (in detail, a power reception section 210 described later) with use of a magnetic field. Specifically, the power transmission section 110 has a function of radiating a magnetic field (magnetic flux) from the feeding surface S1 toward the electronic units 2A and 2B. Note that the detailed configuration of the power transmission section 110 will be described later (FIG. 3 to FIG. 5B).

The high-frequency power generation circuit 111 is a circuit using, for example, power supplied from a power supply source 9 provided outside the feed unit 1 to generate a predetermined high frequency power (an AC signal) for power transmission.

The impedance matching circuit 112 is a circuit performing impedance matching in the power transmission. The efficiency in the power transmission (transmission efficiency) is accordingly improved. Incidentally, the impedance matching circuit 112 may be omitted depending on the configuration of each of the power transmission coil L1, a power reception coil L2 described later, the resonance capacitors C1 and C2, and the like.

The resonance capacitor C1 is a capacitor to configure an LC resonator (a resonance circuit) together with the power transmission coil L1, and is disposed to be connected to the power transmission coil L1 electrically in series, in parallel, or in combination of series and parallel. The LC resonator configured of the power transmission coil L1 and the resonance capacitor C1 allows resonance operation at a resonance frequency (a first resonance frequency) f1. The resonance frequency is substantially equal to or in the vicinity of a frequency of the high-frequency power generated in the high-frequency power generation circuit 111. In addition, the capacitance value of the resonance capacitor C1 is set to obtain such a resonance frequency f1. However, if the resonance frequency f1 is achieved by resonance operation using a parasitic capacitance component (a floating capacitance component) configured of a line capacitance in the power transmission coil L1, a capacitance between the power transmission coil L1 and the power reception coil L2 described later, or the like, the resonance capacitor C1 may be omitted. In addition, if reduction of the transmission efficiency is tolerable, the resonance capacitor C1 may be omitted.

The coupling reinforcing section 3 has a function of reinforcing (enhancing) magnetic coupling between the power transmission coil L1 in the power transmission section 110 and the power reception coil L2 in the power reception section 210 described later. Note that the detailed configuration of the coupling reinforcing section 3 will be described later (FIGS. 4A and 4B and FIGS. 5A and 5B).

(Electronic Units 2A and 2B)

The electronic units 2A and 2B are stationary electronic units typified by a television receiver, mobile electronic units including a rechargeable battery (battery), typified by a mobile phone and a digital camera, and the like. As illustrated in FIG. 2, for example, each of the electronic units 2A and 2B includes a power reception unit 21 and a load 22 performing predetermined operations (operations allowing the electronic units 2A and 2B to exert functions as the electronic units) based on power supplied from the power reception unit 21. In addition, the power reception unit 21 includes the power reception section 210, an impedance matching circuit 212, a rectification circuit 213, a voltage stabilization circuit 214, a battery 215, and the resonance capacitor C2.

The power reception section 210 includes, as a magnetic device (other magnetic device), the power reception coil (the secondary-side coil) L2 described later. The power reception section 210 has a function of using the power reception coil L2 and the resonance capacitor C2 to receive power transmitted from the power transmission section 110 in the feed unit 1. Note that the detailed configuration of the power reception section 210 will be described later (FIG. 3 to FIG. 5B).

The impedance matching circuit 212 is a circuit performing impedance matching in the power transmission, similarly to the above-described impedance matching circuit 112. Incidentally, the impedance matching circuit 212 may also be omitted depending on the configuration of each of the power transmission coil L1, the power reception coil L2 described later, the resonance capacitors C1 and C2, and the like. In addition, if reduction of the transmission efficiency is tolerable, the impedance matching circuit 212 may also be omitted.

The rectification circuit 213 is a circuit rectifying power (AC power) supplied from the power reception section 210 to generate DC power.

The voltage stabilization circuit 214 is a circuit performing a predetermined voltage stabilization operation based on the DC power supplied from the rectification circuit 213, and charging the battery 215 and a battery (not illustrated) in the load 22.

The battery 215 stores power therein in response to the charge by the voltage stabilization circuit 214, and is configured using a rechargeable battery (a secondary battery) such as a lithium ion battery. Note that when the battery only in the load 22 is used, or the like, the battery 215 is not necessarily provided.

The resonance capacitor C2 is a capacitor to configure the LC resonator (the resonance circuit) together with the power reception coil L2, and is disposed to be connected to the power reception coil L2 electrically in series, in parallel, or in combination of series and parallel. The LC resonator configured of the power reception coil L2 and the resonance capacitor C2 allows resonance operation at a resonance frequency f2 (the first resonance frequency). The resonance frequency f2 is substantially equal to or in the vicinity of a frequency of the high-frequency power generated in the high-frequency power generation circuit 111. In other words, the LC resonator configured of the power transmission coil L1 and the resonance capacitor C1 in the power transmission unit 11 and the LC resonator configured of the power reception coil L2 and the resonance capacitor C2 in the power reception unit 21 each perform the resonance operation at the resonance frequencies substantially equal to each other (f1≈f2). Moreover, the capacitance value of the resonance capacitor C2 is set to obtain such a resonance frequency f2. However, if the resonance frequency f2 is achieved by a resonance operation using a parasitic capacitance component configured of a line capacitance in the power reception coil L2, a capacitance between the power transmission coil L1 and the power reception coil L2, or the like, the resonance capacitor C2 may also be omitted. In addition, if reduction of the transmission efficiency is tolerable, the resonance frequency f2 may be different from the resonance frequency f1 (f2≠f1), or the resonance capacitor C2 may be omitted.

[Detailed Configuration of Power Transmission Section 110 and Power Reception Section 210]

Figure 3:
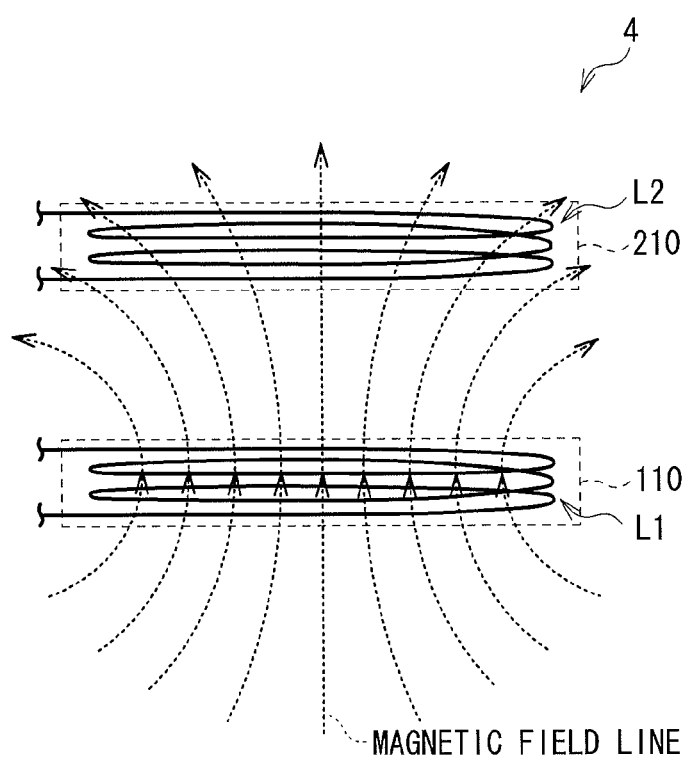
FIG. 3 is a schematic diagram illustrating a schematic configuration example of a power transmission section and a power reception section illustrated in FIG. 2.
Figure 4A:
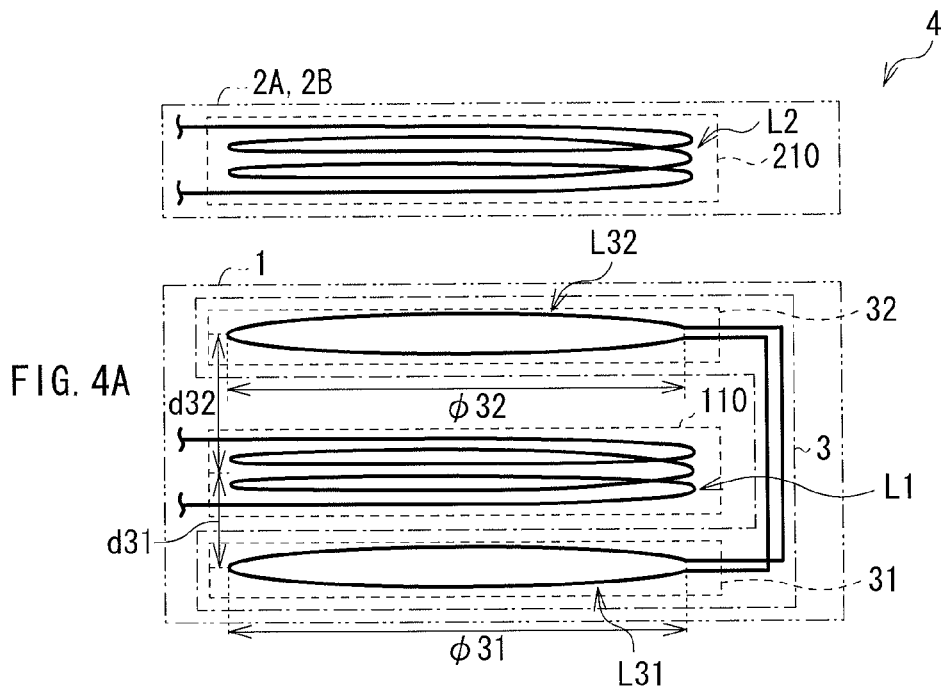
FIGS. 4A and 4B are schematic diagrams each illustrating a detailed configuration example of a coupling reinforcing section illustrated in FIG. 2.
Figure 4B:
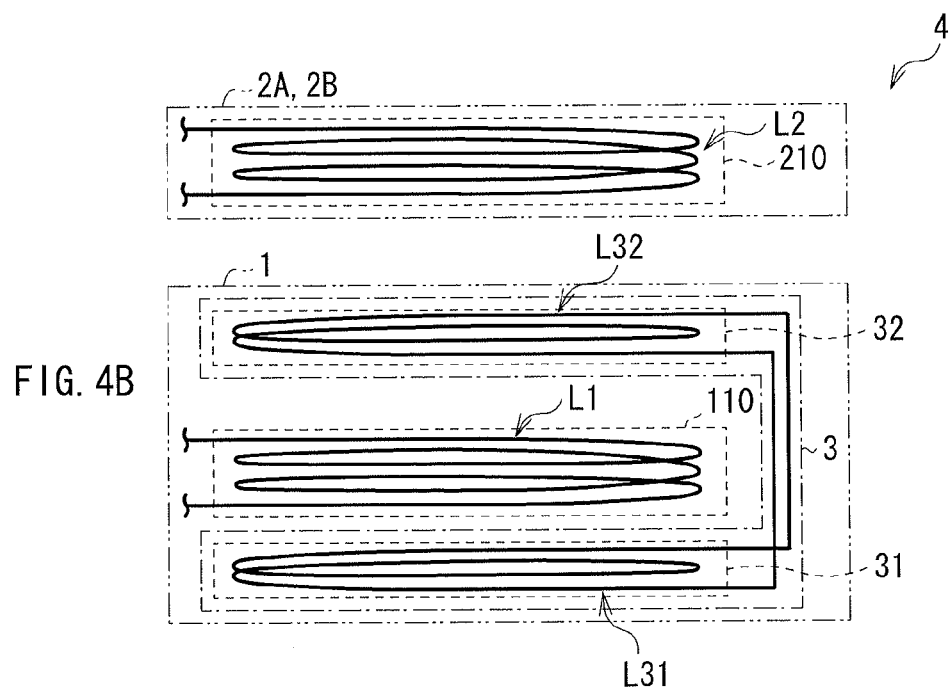
Figure 5A:
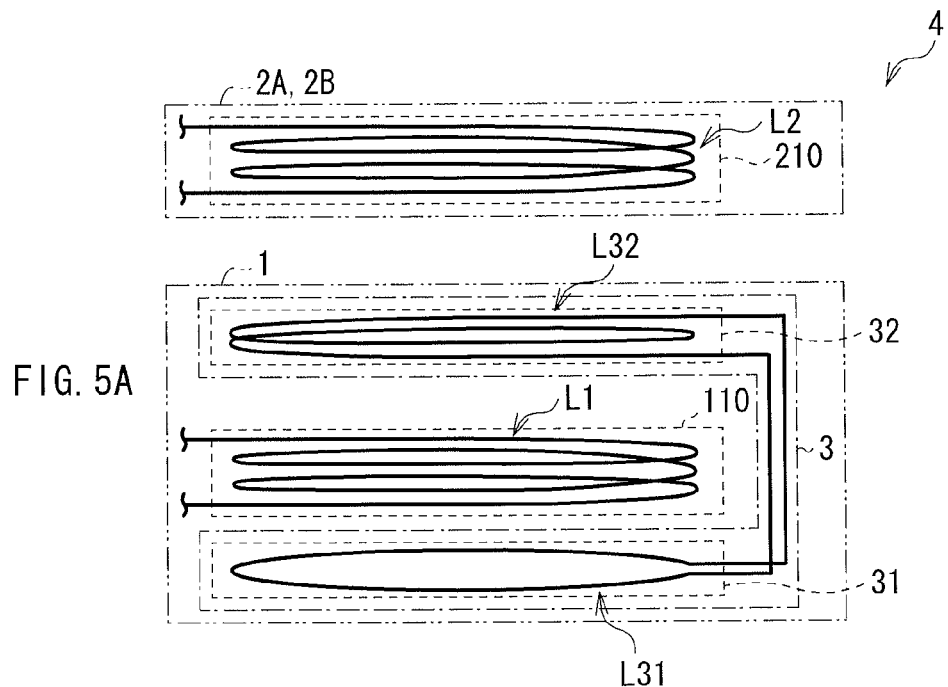
FIGS. 5A and 5B are schematic diagrams each illustrating another detailed configuration example of the coupling reinforcing section illustrated in FIG. 2.
Figure 5B:
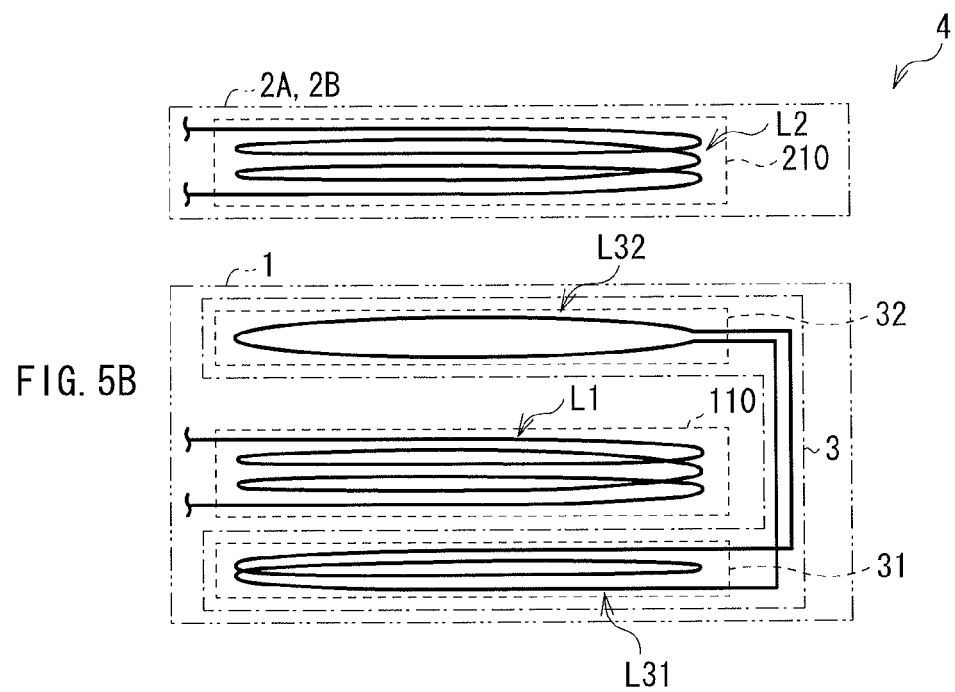

FIG. 3 schematically illustrates a schematic configuration of the power transmission section 110 and the power reception section 210. The power transmission section 110 includes one or more (herein, one) power transmission coils L1, and the power reception section 210 includes one or more (herein, one) power reception coils L2. The power transmission coil L1 and the power reception coil L2 are capable of being magnetically coupled with each other. Note that the power transmission section 110 and the power reception section 210 may include one or more coils, or one or more LC resonators each configured of a coil and a capacitor, in addition to the power transmission coils L1 and the power reception coils L2.

These coils (the power transmission coil L1, the power reception coil L2, and the like) are each not limited to an open coil (a conductive coil) in a shape formed by winding a conductive wire (material) plural times, and may be an open loop (a conductive loop) formed by winding a conductive wire once. Incidentally, as the conductive coil and the conductive loop, a coil (a wound coil) and a loop (a wound loop) formed by winding a conductive wire, a coil (a pattern coil) and a loop (a pattern loop) configured of a conductive pattern such as a printed board (a printed wiring board) and a flexible printed board (a flexible printed wiring board), or the like are used. Moreover, the pattern coil and the pattern loop may be formed by printing or depositing a conductive material, processing a conductive plate or a conductive sheet, or the like.

FIG. 3 also illustrates a distribution example of magnetic field lines generated from the power transmission coil L1 at a certain phase. The power transmission coil L1 is a coil transmitting power (generating a magnetic flux) with use of a magnetic flux (magnetic field lines or a magnetic field), as described above. On the other hand, the power reception coil L2 is a coil receiving the power (from the magnetic flux, the magnetic field lines, or the magnetic field) transmitted from the power transmission section 110.

[Detailed Configuration of Coupling Reinforcing Section 3]

FIGS. 4A and 4B and FIGS. 5A and 5B each schematically illustrate the detailed configuration example of the coupling reinforcing section 3 described above. The coupling reinforcing section 3 includes a current generation section 31 (a first current generation section) and a current generation section 32 (a second current generation section) that are electrically connected to each other. Specifically, both ends of the current generation section 31 are respectively electrically connected by a wire to both ends of the current generation section 32 with use of a conductive wire, and the like. Incidentally, as will be described later, the coupling reinforcing section 3 is desirably electrically insulated (is not connected through electrical points) from the power transmission section 110 (the power transmission coil L1) and the power reception section 210 (the power reception coil L2) so that a relatively large current is generated in the current generation section 31. However, this is not limitative.

In this case, both ends of the current generation section 31 are respectively electrically connected to both ends of the current generation section 32 so that a flowing direction of a current (a first current) generated from the current generation section 31 is opposite to a flowing direction of a current (a second current) generated from the current generation section 32. In addition, the current generation sections 31 and 32 and the power transmission coil L1 (the magnetic device) are arranged so that an amount of the current (the first current) generated from the current generation section 31 is larger than that of the current (the second current) generated from the current generation section 32. Specifically, in this case, the current generation sections 31 and 32 and the power transmission coil L1 are arranged so that a distance d31 between the current generation section 31 and the power transmission coil L1 is smaller than a distance d32 between the current generation section 32 and the power transmission coil L1 (d32>d31). However, this is not limitative, and the above-described magnitude relationship between the amounts of the currents may be established by allowing inner diameters φ31 and φ32, shapes, the number of windings to be different between the magnetic devices L31 and L32 in the current generation sections 31 and 32 described later.

Moreover, in the coupling reinforcing section 3 of the embodiment, the power transmission coil L1 is disposed (in a gap) between the current generation sections 31 and 32. In other words, the current generation section 32 is disposed (in a gap) between the power transmission coil L1 and the power reception coil L2, and the current generation section 31 is disposed outside of the gap between the power transmission coil L1 and the power reception coil L2.

Herein, the current generation sections 31 and 32 include magnetic devices L31 and L32, respectively, which are each formed of a conductive open coil or a conductive open loop, for example. Specifically, the current generation sections 31 and 32 includes the magnetic devices L31 and L32, respectively, which are each formed of a conductive open loop in the example illustrated in FIG. 4A, and which are each formed of a conductive open coil in the example illustrated in FIG. 4B. In addition, in the example illustrated in FIG. 5A, the current generation section 31 includes the magnetic device L31 formed of a conductive open loop, and the current generation section 32 includes the magnetic device L32 formed of a conductive open coil. In the example illustrated in FIG. 5B, the current generation section 31 includes the magnetic device L31 formed of a conductive open coil, and the current generation section 32 includes the magnetic device L32 formed of a conductive open loop.

Incidentally, as the open coil and the open loop, a coil (a wound coil) and a loop (a wound loop) formed by winding a conductive wire, a coil (a pattern coil) and a loop (a pattern loop) configured of a conductive pattern such as a printed board (a printed wiring board) and a flexible printed board (a flexible printed wiring board), or the like are used. Moreover, the pattern coil and the pattern loop may be formed by printing or depositing a conductive material, processing a conductive plate or a conductive sheet, or the like.

[Functions and Effects of Feed System 4]

(1. Outline of General Operation)

In the feed system 4, in the feed unit 1, the high-frequency power generation circuit 111 supplies predetermined high-frequency power (an AC signal) for power transmission, to the power transmission coil L1 in the power transmission section 110 and the resonance capacitor C1 (the LC resonator). Accordingly, a magnetic field (a magnetic flux) is generated in the power transmission coil L1 in the power transmission section 110. At this time, when the electronic units 2A and 2B to be fed with power (to be charged) are placed (or closely disposed) on a top surface (the feeding surface S1) of the feed unit 1, the power transmission coil L1 in the feed unit 1 is allowed to come close to the power reception coil L2 in each of the electronic units 2A and 2B near the feeding surface S1.

In this way, when the power reception coil L2 is disposed near the power transmission coil L1 generating the magnetic field (the magnetic flux), electromotive force is generated in the power reception coil L2 by induction of the magnetic flux generated from the power transmission coil L1. In other words, interlinkage magnetic field is generated in each of the power transmission coil L1 and the power reception coil L2 by electromagnetic induction or magnetic resonance. As a result, power is transmitted from the power transmission coil L1 side (a primary side, the feed unit 1 side, the power transmission section 110 side) to the power reception coil L2 side (a secondary side, the electronic units 2A and 2B side, the power reception section 210 side) (see power P1 illustrated in FIG. 2). At this time, in the feed unit 1, resonance operation (at the resonance frequency f1) is performed with use of the power transmission coil L1 and the resonance capacitor C1, and in the electronic units 2A and 2B, resonance operation (at the resonance frequency f2≠f1) is performed with use of the power reception coil L2 and the resonance capacitor C2.

Then, in the electronic units 2A and 2B, the AC power received by the power reception coil L2 is supplied to the rectification circuit 213 and the voltage stabilization circuit 214, thereby leading to the following charging operation. Specifically, after the AC power is converted into predetermined DC power by the rectification circuit 213, the voltage stabilization operation is performed by the voltage stabilization circuit 214, based on the DC power, and thus the battery 215 or a battery (not illustrated) in the load 22 is charged. In this way, in the electronic units 2A and 2B, the charging operation based on the power received by the power reception section 210 is performed.

Accordingly, in the embodiment, terminal connection to an AC adopter or the like is not necessary for charging of the electronic units 2A and 2B, and charging is easily started (non-contact feeding is performed) only by placing (closely disposing) the electronic units 2A and 2B on the feeding surface S1 of the feed unit 1. This leads to liability relief of a user.

(2. Function of Coupling Reinforcing Section 3)

The function of the coupling reinforcing section 3 that is one of features of the embodiment will be described in detail with comparing to comparative examples (comparative examples 1 and 2).

COMPARATIVE EXAMPLE 1

Figure 6A:
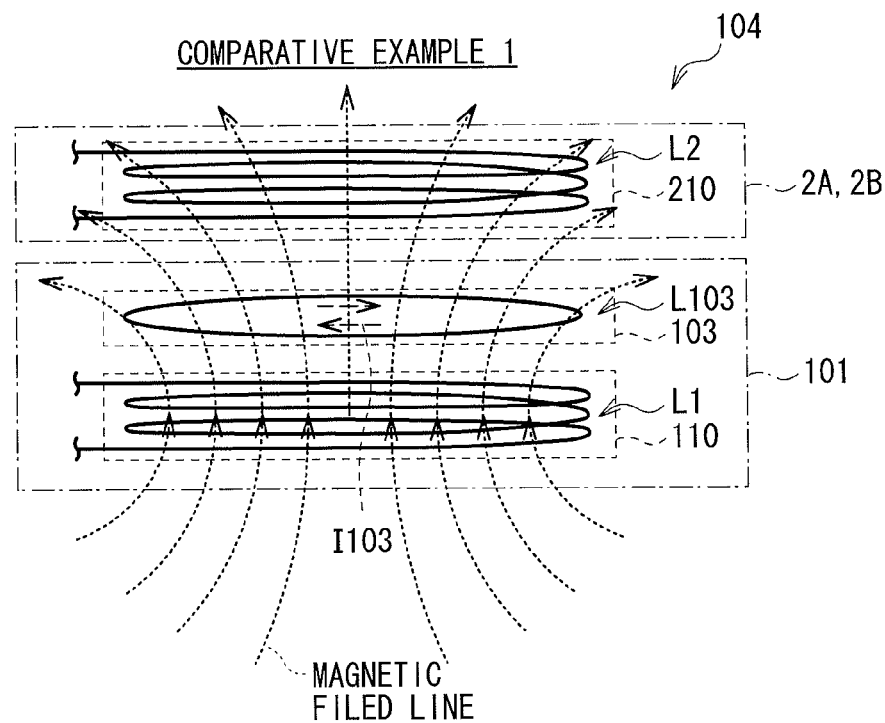
FIGS. 6A and 6B are schematic diagrams illustrating a schematic configuration of a feed system according to comparative examples 1 and 2, respectively.

FIG. 6A illustrates a schematic configuration of a feed system (a feed system 104) according to a comparative example 1. The feed system 104 of the comparative example 1 is a system performing non-contact power transmission with use of a magnetic field, similarly to the feed system 4. The feed system 104 includes a feed unit 101 having the power transmission section 110 and a current generation section 103, and the electronic units 2A and 2B.

Unlike the feed unit 1, in the feed unit 101, the current generation section 103 having a coil L103 is disposed (in a gap) between the power transmission coil L1 and the power reception coil L2. On the other hand, no current generation section is disposed outside of the gap between the power transmission coil L1 and the power reception coil L2. Accordingly, the following disadvantages occur in the comparative example 1.

In such a configuration, when the magnetic flux (components obtained by adding vertical components of magnetic field lines passing through a certain area in the magnetic field) passing through the current generation section 103 is changed, electromotive force intending to flow a current in a direction preventing the change is induced in the current generation section 103. As a result, a current (a ring current) I103 flows through the current generation section 103 (Faraday's law of electromagnetic induction, Lenz's law). When the magnetic field lines in a direction illustrated in FIG. 6A are generated from the power transmission section 110 (the power transmission coil L1) at a certain phase, the direction of the magnetic field lines is as follows since the direction of the magnetic field lines is changed depending on a phase. Specifically, the current I103 is generated in the direction illustrated in FIG. 6A, and the magnetic flux in a direction reducing the magnetic flux generated from the power transmission section 110 (the power transmission coil L1) is generated from the current generation section 103. As a result, the magnetic coupling between the power transmission section 110 (the power transmission coil L1) and the power reception section 210 (the power reception coil L2) is weakened. Therefore, the transmission efficiency (the feeding efficiency) is reduced when only such a current generation section 103 is provided.

COMPARATIVE EXAMPLE 2

Figure 6B:
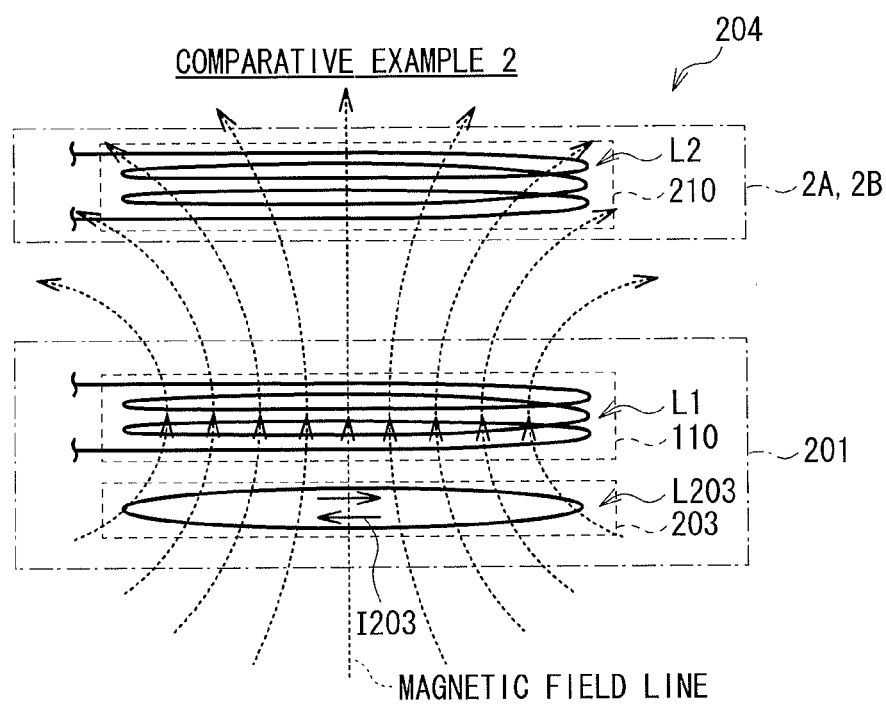

FIG. 6B illustrates a schematic configuration of a feed system (a feed system 204) according to a comparative example 2. The feed system 204 of the comparative example 2 is a system performing non-contact power transmission with use of a magnetic field, similarly to the feed system 4. The feed system 204 includes a feed unit 201 having the power transmission section 110 and a current generation section 203, and the electronic units 2A and 2B.

Unlike the feed units 1 and 101, in the feed unit 201, the current generation section 203 having a coil L203 is disposed outside of a gap between the power transmission coil L1 and the power reception coil L2. On the other hand, no current generation section is disposed (in the gap) between the power transmission coil L1 and the power reception coil L2. Accordingly, the following disadvantages occur in the comparative example 2.

With such a configuration, similarly to the comparative example 1, magnetic flux in a direction reducing the magnetic flux generated from the power transmission section 110 (the power transmission coil L1) is generated from the current generation section 203, due to the direction of a current (a ring current) I203 generated from the current generation section 203. As a result, also in the comparative example 2, the magnetic coupling between the power transmission section 110 (the power transmission coil L1) and the power reception section 210 (the power reception coil L2) is weakened, thereby resulting in reduction of the transmission efficiency (the feeding efficiency).

In the case of such a configuration, a magnetic flux leaked to the outside of the gap between the power transmission section 110 (the power transmission coil L1) and the power reception section 210 (the power reception coil L2) and to the outside from the power transmission section 110 side (on a lower side of the power transmission coil L1 in FIG. 6B) is reduced. In other words, an effect of a so-called magnetic shield is obtained by the current generation section 203 disposed outside of the gap between the power transmission coil L1 and the power reception coil L2.

(Embodiment)

In contrast, in the embodiment, the coupling reinforcing section 3 including the magnetic devices (the open loop or the open coil) L31 and L32 which are configured as illustrated in FIGS. 4A and 4B and FIGS. 5A and 5B is provided. Therefore, the disadvantages in the comparative examples 1 and 2, for example, are resolved. Specifically, as will be described in detail below, magnetic coupling between magnetic devices (herein, the power transmission coil L1 and the power reception coil L2) in different units (herein, the feed unit 1 and the electronic units 2A and 2B) is enhanced by providing the coupling reinforcing section 3 which reinforces the magnetic coupling between the magnetic devices.

Figure 7:
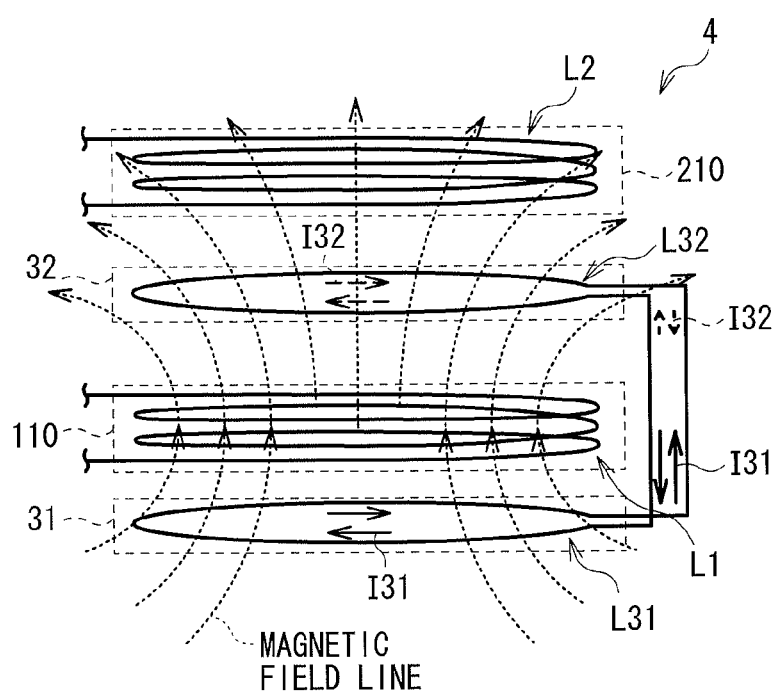
FIG. 7 is a schematic diagram for explaining functions of the coupling reinforcing section according to the first embodiment.

FIG. 7 schematically illustrates directions of currents (currents I31 and I32 flowing in a ring pattern) generated in the coupling reinforcing section 3. Incidentally, the case of the configuration illustrated in FIG. 4A (the case where each of the current generation sections 31 and 32 is formed of an open loop) is described as an example.

In the coupling reinforcing section 3, both ends of the current generation section 31 are respectively electrically connected to both ends of the current generation section 32 so that the flowing direction of the current I31 generated in the current generation section 31 is opposite to the flowing direction of the current I32 generated in the current generation section 32. In addition, the current generation sections 31 and 32 and the power transmission coil L1 are disposed so that the amount of the current I31 generated in the current generation section 31 is larger than that of the current I32 generated in the current generation section 32 (I31>I32). Specifically, in this case, the current generation sections 31 and 32 and the power transmission coil L1 are disposed so that the distance d31 between the current generation section 31 and the power transmission coil L1 is smaller than the distance d32 between the current generation section 32 and the power transmission coil L1 (d32>d31).

As described above, the currents I31 and I32 each flow in the directions illustrated in FIG. 7, and the current I31 is larger than the current I32. Therefore, in the current generation section 32, a current actually flows in the direction same as the flowing direction of the current I31 (in a direction opposite to the flowing direction of the current I32). In other words, in the current generation section 32, the current flows in a direction opposite to the flowing direction of the current I103 generated in the current generation section 103 illustrated in FIG. 6A. As a result, a magnetic flux (magnetic field lines, a magnetic field) enhancing the magnetic coupling between the power transmission section 110 (the power transmission coil L1) and the power reception section 210 (the power reception coil L2) is generated near the current generation section 32. Accordingly, in the embodiment, the transmission efficiency (the feeding efficiency) is improved, compared with that in the comparative examples 1 and 2.

Moreover, also in the embodiment, similarly to the above-described comparative example 2, a magnetic flux leaked to the outside of the gap between the power transmission section 110 (the power transmission coil L1) and the power reception section 210 (the power reception coil L2) and to the outside from the power transmission section 110 side (on the lower side of the power transmission coil L1) is reduced. In other words, the effect of a so-called magnetic shield is obtained by the current generation section 31 disposed outside of the gap between the power transmission coil L1 and the power reception coil L2.

Figure 8A:
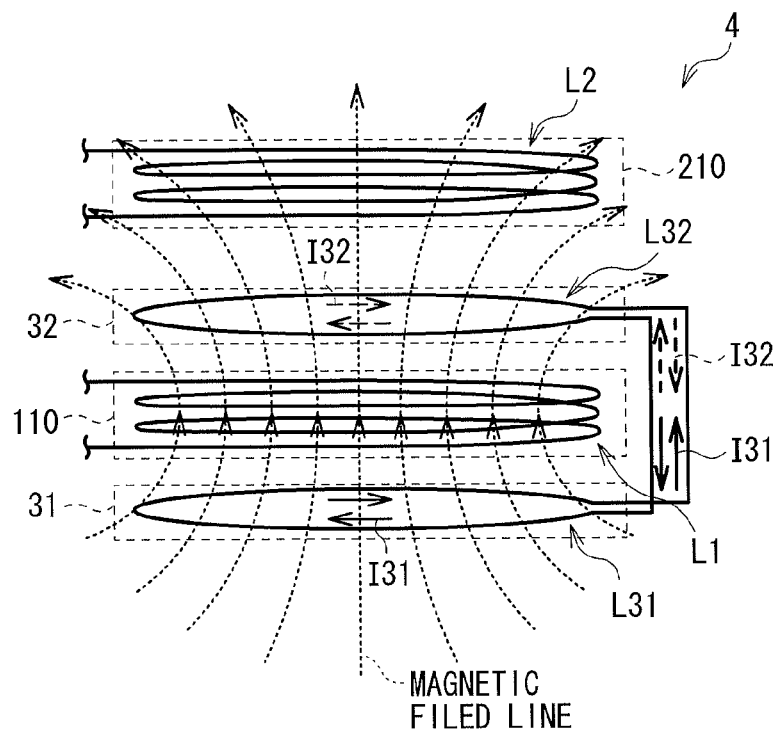
FIGS. 8A and 8B are schematic diagrams for explaining the detail of the functions of the coupling reinforcing section according to the first embodiment.

Incidentally, in a configuration example illustrated in FIG. 8A, the distance d32 between the current generation section 32 and the power transmission coil L1 is substantially equal to the distance d31 between the current generation section 31 and the power transmission coil L1 (d32≈d31). In such a positional relationship, the current I31 generated from the current generation section 31 is substantially equal to the current I32 generated from the current generation section 32. As a result, there is little possibility of improvement in the transmission efficiency (the feeding efficiency) since the current hardly flows in the current generation sections 31 and 32.

Figure 8B:
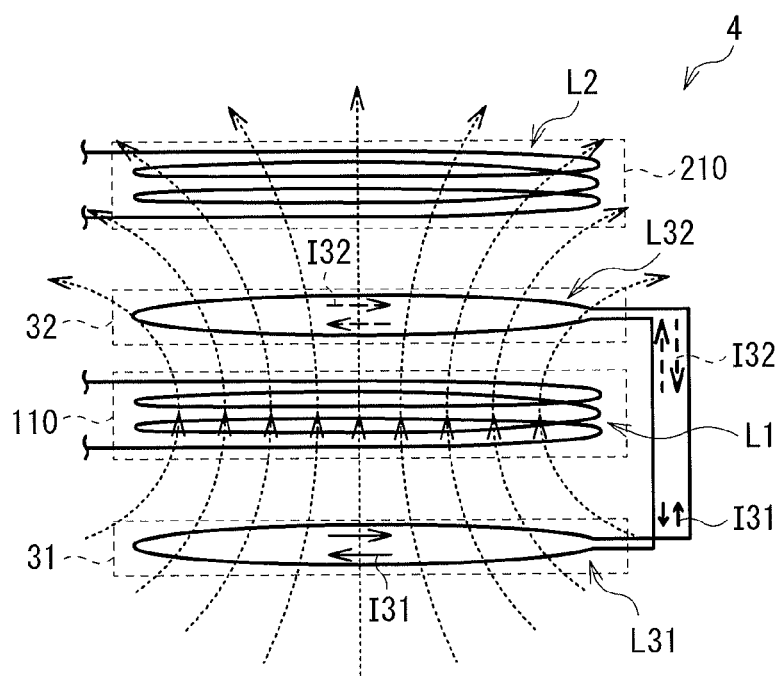

Moreover, in a configuration example illustrated in FIG. 8B, the distance d32 between the current generation section 32 and the power transmission coil L1 is smaller than the distance d31 between the current generation section 31 and the power transmission coil L1 (d31>d32). In such a positional relationship, the current I32 generated from the current generation section 32 is larger than the current I31 generated from the current generation section 31. As a result, in the current generation section 31, a current flows in the direction same as the flowing direction of the current I32 generated from the current generation section 32. Specifically, the current I32 flows through the current generation section 32 in the direction same as the flowing direction of the current I103 generated in the current generation section 103 illustrated in FIG. 6A. As a result, magnetic flux (magnetic field lines, a magnetic field) deteriorating the magnetic coupling between the power transmission section 110 (the power transmission coil L1) and the power reception section 210 (the power reception coil L2) is generated near the current generation section 32. Accordingly, also in this case, there is little possibility of improvement in the transmission efficiency (the feeding efficiency).

From these points, as described above, the current generation sections 31 and 32 and the power transmission coil L1 are desirably arranged so that the distance d31 between the current generation section 31 and the power transmission coil L1 is smaller than the distance d32 between the current generation section 32 and the power transmission coil L1 (d32>d31).

(Example of First Embodiment)

Figure 9:
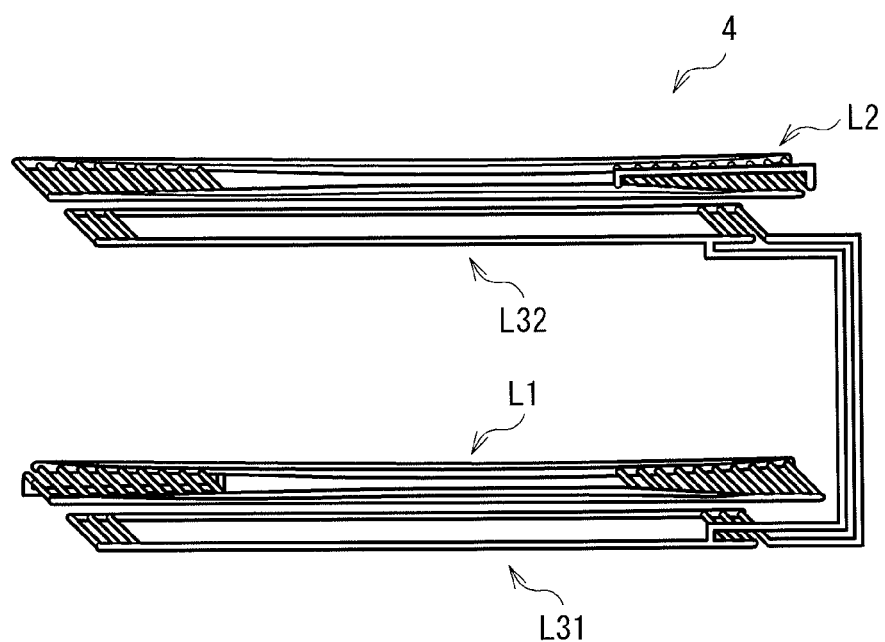
FIG. 9 is a schematic diagram illustrating a configuration of each coil according to Example of the first embodiment.
Figures 10, 11:
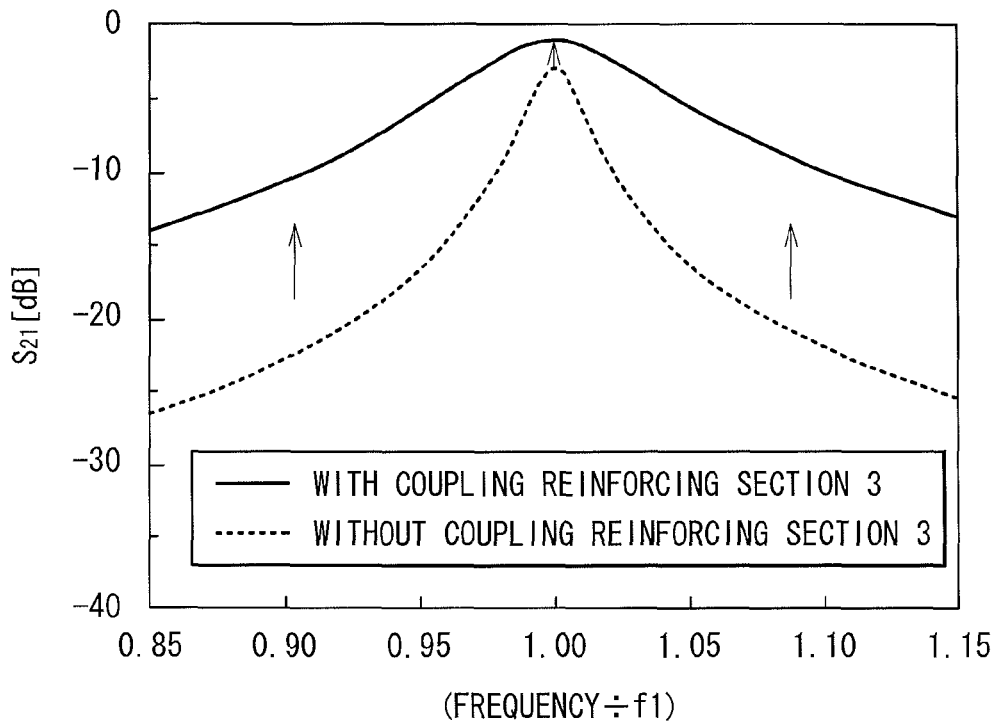
FIG. 10 is a characteristic diagram illustrating an example of data according to the Example of the first embodiment.
FIG. 11 is a characteristic diagram illustrating another example of the data according to the Example of the first embodiment.
Figure 12A:
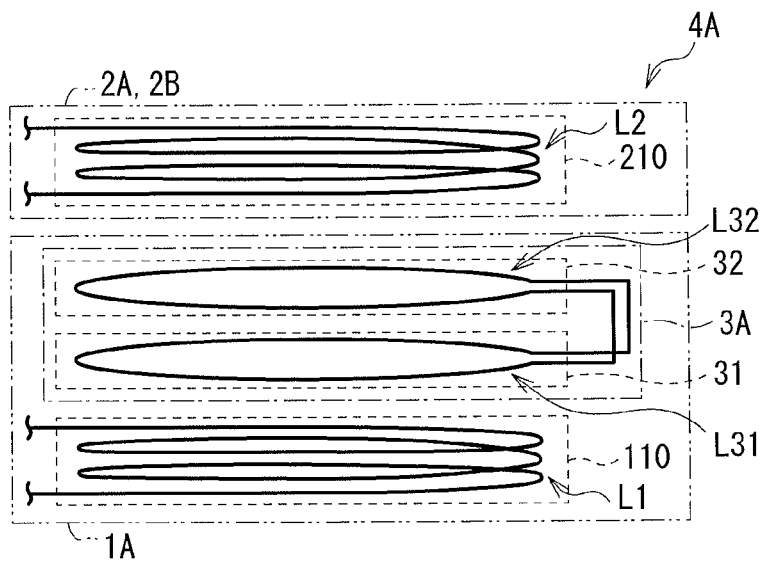
FIGS. 12A and 12B are schematic diagrams each illustrating a schematic configuration example of a feed system according to a second embodiment of the disclosure.
Figure 12B:
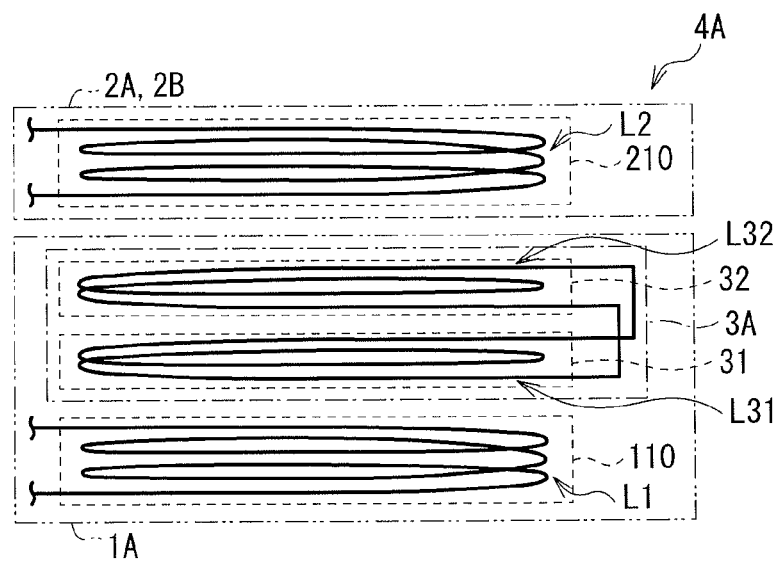
Figure 13A:
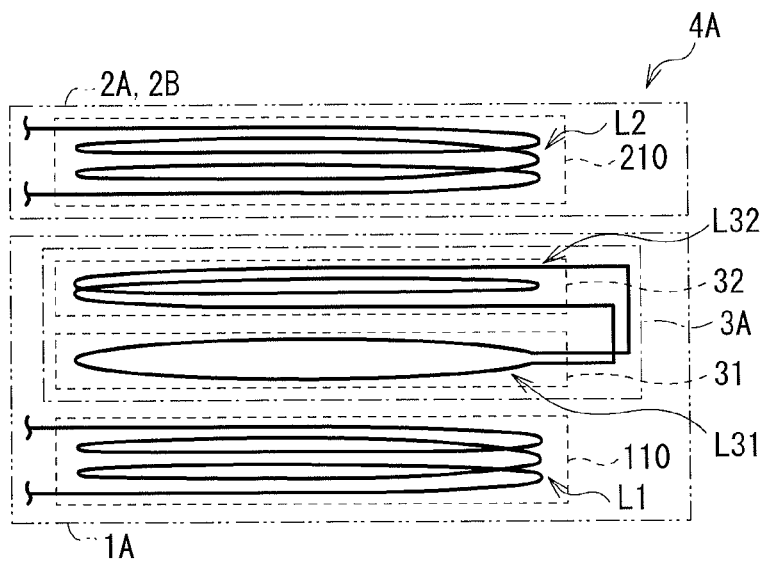
FIGS. 13A and 13B are schematic diagrams each illustrating another schematic configuration example of the feed system according to the second embodiment.
Figure 13B:
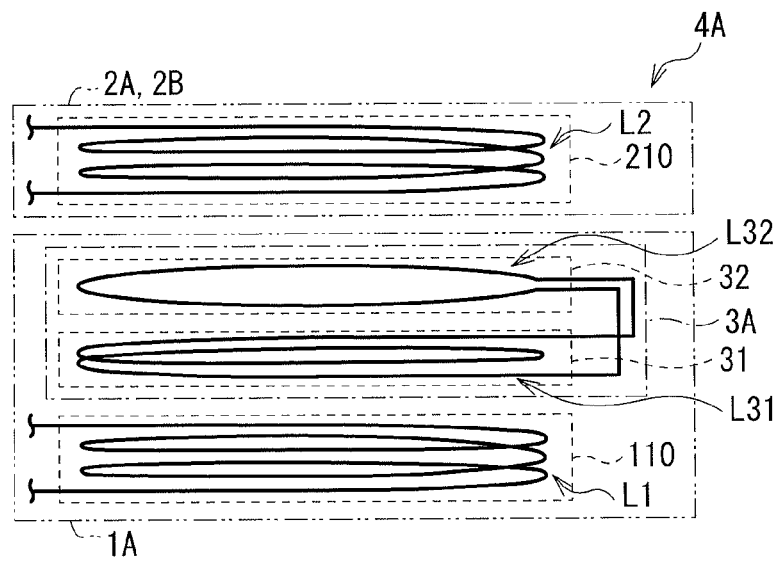

FIG. 9 to FIG. 11 each illustrate Example of the embodiment. In the Example, electromagnetic field analysis is performed on an analytical model configured of the coils (the power transmission coil L1, the power reception coil L2, and the magnetic devices L31 and L32) with a perspective structure illustrated in FIG. 9 to obtain various kinds of data illustrated in FIG. 10 and FIG. 11. Note that in the Example, conductive coils having the same shape are used for the power transmission coil L1 and the power reception coil L2, for ease of understanding the phenomenon. In addition, although the resonance capacitor C1 described above is used herein, the resonance capacitor C2 described above is not used, for ease of understanding the phenomenon. In other words, the resonance operation (at the resonance frequency f1) using the power transmission coil L1 and the resonance capacitor C1 is performed in the feed unit 1 while the resonance operation (at the resonance frequency f2) using the power reception coil L2 and the resonance capacitor C2 is not performed in each of the electronic units 2A and 2B.

FIG. 10 illustrates an example of variation in transmission property depending on presence or absence of the coupling reinforcing section 3. Herein, $S_{21}$ (S parameter) in the vertical axis is a parameter related to the transmission efficiency (the feeding efficiency). It is found from FIG. 10 that, with the coupling reinforcing section 3 provided, the maximum value (the maximum transmission efficiency) of $S_{21}$ is largely increased at the frequency (1×f1) near the resonance frequency f1 in the power transmission. In addition, it is also found that, with the coupling reinforcing section 3 provided, the band width (the width of the frequency band) of $S_{21}$ is increased at the frequency (1×f1) near the resonance frequency f1 in the power transmission. This indicates that the coupling reinforcing section 3 leads to enhancement of the magnetic coupling between the power transmission section 110 (the power transmission coil L1) and the power reception section 210 (the power reception coil L2).

FIG. 11 is a table of summary of differences in the maximum transmission efficiency in the case where the magnetic devices L31 and L32 in the configuration of FIG. 9 are used with combination of the open coil and the open loop. Note that the open coil and the open loop are made of the same wire and have the same outermost size. It is found from FIG. 11 that the maximum transmission efficiency is the highest when both the current generation sections 31 and 32 are configured using the open coil. Moreover, it is found that the maximum transmission efficiency is the second highest when both the current generation sections 31 and 32 are configured using the open loop. On the other hand, when the current generation section 31 is configured using the open loop and the current generation section 32 is configured using the open coil, or when the current generation section 31 is configured using the open coil and the current generation section 32 is configured using the open loop, the coupling reinforcing section 3 leads to enhancement of the transmission efficiency (the feeding efficiency), but the degree of the enhancement is relatively small.

As described above, in the embodiment, the coupling reinforcing section 3 reinforcing the magnetic coupling between the magnetic devices (the power transmission coil L1 and the power reception coil L2) in the different units (the feed unit 1 and the electronic units 2A and 2B) is provided. Therefore, the magnetic coupling between the magnetic devices is enhanced. As a result, energy loss is allowed to be reduced (herein, the transmission efficiency (the feeding efficiency) is allowed to be improved) when operation using the magnetic coupling between the magnetic devices is performed.

Moreover, the power transmission coil L1 is disposed (in the gap) between the current generation sections 31 and 32, and thus, the magnetic flux leaked to the outside of the gap between the power transmission section 110 and the power reception section 210 and to the outside from the power transmission section 110 side (on the lower side of the power reception coil L1) is allowed to be reduced. In other words, it may be possible to obtain the effect of a so-called magnetic shield by the current generation section 31 provided outside of the gap between the power transmission coil L1 and the power reception coil L2.

Subsequently, other embodiments (second and third embodiments) of the disclosure will be described. Note that like numerals are used to designate substantially like components of the first embodiment, and the description thereof will be appropriately omitted.

[Second Embodiment]
[Configuration of Feed System 4A]

FIGS. 12A and 12B and FIGS. 13A and 13B each schematically illustrate a schematic configuration example of a feed system (a feed system 4A) according to a second embodiment. The feed system 4A of the second embodiment is a system performing non-contact power transmission with use of a magnetic field, similarly to the feed system 4. The feed system 4A includes a feed unit 1A having the power transmission section 110 and a coupling reinforcing section 3A, and the electronic units 2A and 2B.

The coupling reinforcing section 3A includes the current generation sections 31 and 32, similarly to the coupling reinforcing section 3 of the first embodiment. Specifically, in the example illustrated in FIG. 12A, the current generation sections 31 and 32 include the magnetic devices L31 and L32, respectively, each configured of a conductive open loop. In the example illustrated in FIG. 12B, the current generation sections 31 and 32 include the magnetic devices L31 and L32, respectively, each configured of a conductive open coil. In addition, in the example illustrated in FIG. 13A, the current generation section 31 includes the magnetic device L31 configured of a conductive open loop and the current generation section 32 includes the magnetic device L32 configured of a conductive open coil. In the example illustrated in FIG. 13B, the current generation section 31 includes the magnetic device L31 configured of a conductive open coil and the current generation section 32 includes the magnetic device L32 configured of a conductive open loop. Specifically, in the coupling reinforcing section 3A of the second embodiment, the current generation sections 31 and 32 include the magnetic devices L31 and L32, respectively, each configured of a conductive open coil or a conductive open loop.

In the coupling reinforcing section 3A, however, unlike the coupling reinforcing section 3, the current generation sections 31 and 32 are disposed so as to be located (in a gap) between the power transmission coil L1 (the magnetic device) and the power reception coil L2 (the other magnetic device).

[Function and Effects of Feed System 4A]

Also in the feed system 4A of the second embodiment, the coupling reinforcing section 3A with the above-described configuration leads to enhancement of the magnetic coupling between the power transmission coil L1 and the power reception coil L2 (between the magnetic devices). In the coupling reinforcing section 3A, however, the current generation sections 31 and 32 are located (in the gap) between the power transmission coil L1 and the power reception coil L2 as described above. As a result, unlike the coupling reinforcing section 3 of the first embodiment, an effect of the magnetic shield is hardly obtainable.

Figure 14:
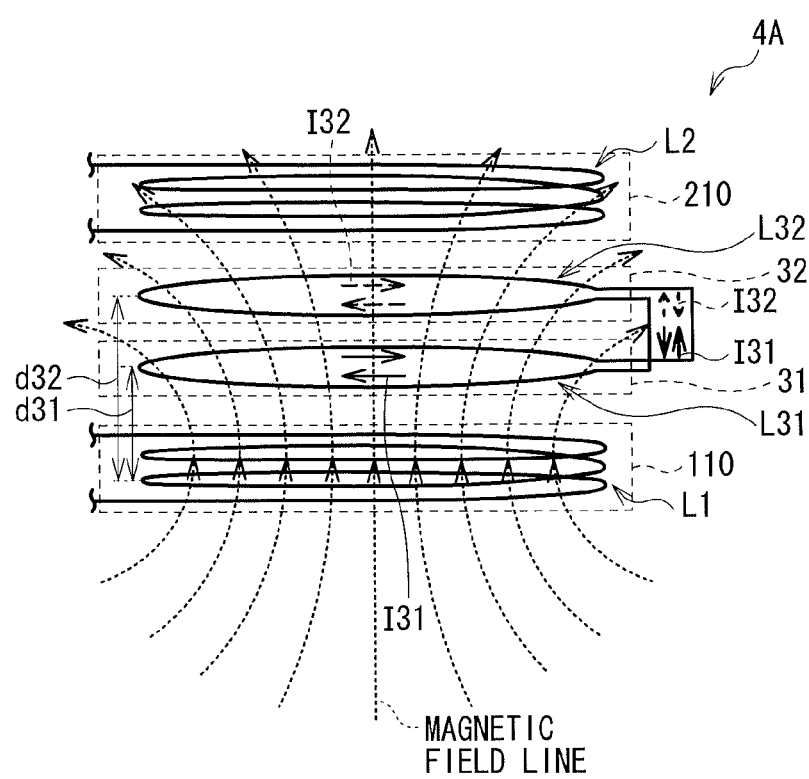
FIG. 14 is a schematic diagram for explaining functions of a coupling reinforcing section according to the second embodiment.

FIG. 14 schematically illustrates directions of currents (the currents I31 and I32 flowing in a ring pattern) generated in the coupling reinforcing section 3A. Note that the case of the configuration illustrated in FIG. 12A (the case where each of the current generation sections 31 and 32 is formed of an open loop) is described as an example.

In the coupling reinforcing section 3A, similarly to the coupling reinforcing section 3, both ends of the current generation section 31 are respectively electrically connected to both ends of the current generation section 32 so that the flowing direction of the current I31 generated in the current generation section 31 is opposite to the flowing direction of the current I32 generated in the current generation section 32. Moreover, the current generation sections 31 and 32 and the power transmission coil L1 are arranged so that the amount of the current I31 generated in the current generation section 31 is larger than that of the current I32 generated in the current generation section 32 (I31>I32). Specifically, in this case, the current generation sections 31 and 32 and the power transmission coil L1 are arranged so that the distance d31 between the current generation section 31 and the power transmission coil L1 is smaller than the distance d32 between the current generation section 32 and the power transmission coil L1 (d32>d31).

In this way, as illustrated in FIG. 14, the flowing direction of the current I31 is opposite to the flowing direction of the current I32, and the current I31 is larger than the current I32. As a result, the magnetic flux (the magnetic field lines, the magnetic field) enhancing the magnetic coupling between the power transmission section 110 (the power transmission coil L1) and the power reception section 210 (the power reception coil L2) is generated near the current generation section 32. Accordingly, also in the second embodiment, the transmission efficiency (the feeding efficiency) is improved, compared with that in the comparative examples 1 and 2.

(Example of Second Embodiment)

Figures 15A, 15B:
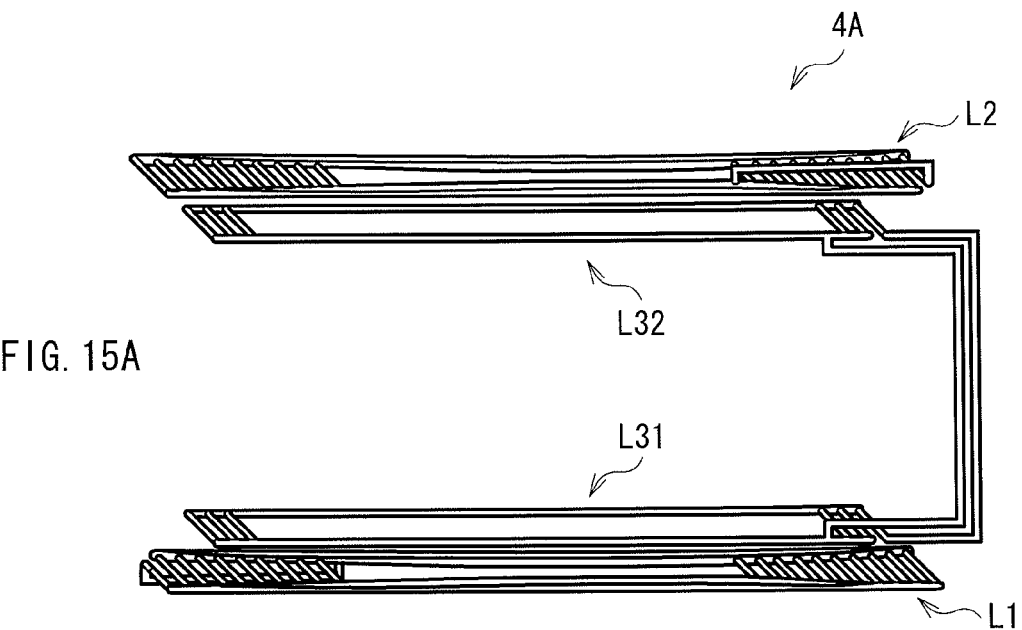
FIGS. 15A and 15B are diagrams illustrating an example of a configuration of each coil and an example of data, respectively, according to Example of the second embodiment.

FIGS. 15A and 15B each illustrate Example of the second embodiment. In the Example, electromagnetic field analysis is performed on an analytical model configured of the coils (the power transmission coil L1, the power reception coil L2, and the magnetic devices L31 and L32) with a perspective structure illustrated in FIG. 15A, to obtain various kinds of data illustrated in FIG. 15B. Note that, also in the Example, conductive coils having the same shape are used for the power transmission coil L1 and the power reception coil L2, for ease of understanding the phenomenon. Moreover, although the resonance capacitor C1 described above is used herein, the resonance capacitor C2 described above is not used, for ease of understanding the phenomenon. In other words, the resonance operation (at the resonance frequency f1) using the power transmission coil L1 and the resonance capacitor C1 is performed in the feed unit 1 while the resonance operation (at the second frequency f2) using the power reception coil L2 and the resonance capacitor C2 is not performed in each of the electronic units 2A and 2B.

FIG. 15B is a table of summary of differences in the maximum transmission efficiency in the case where magnetic devices L31 and L32 in the configuration of FIG. 15A are used with combination of the open coil and the open loop. Note that the open coil and the open loop are made of the same wire and have the same outermost size. It is found from FIG. 15B that the maximum transmission efficiency is the highest when both the current generation sections 31 and 32 are configured using the open coil. Moreover, it is found that the maximum transmission efficiency is the second highest when both the current generation sections 31 and 32 are configured using the open loop. On the other hand, when the current generation section 31 is configured using the open loop and the current generation section 32 is configured using the open coil, or when the current generation section 31 is configured using the open coil and the current generation section 32 is configured using the open loop, the coupling reinforcing section 3A leads to enhancement of the transmission efficiency (the feeding efficiency), but the degree of the enhancement is relatively small.

As described above, in the second embodiment, since the coupling reinforcing section 3A is provided, similar effects are obtainable by functions similar to those in the first embodiment. Specifically, energy loss is allowed to be reduced (herein, the transmission efficiency (the feeding efficiency) is allowed to be improved) when the operation using the magnetic coupling between the magnetic devices is performed.

[Third Embodiment]
[Configuration of Feed System 4B]

Figure 16:
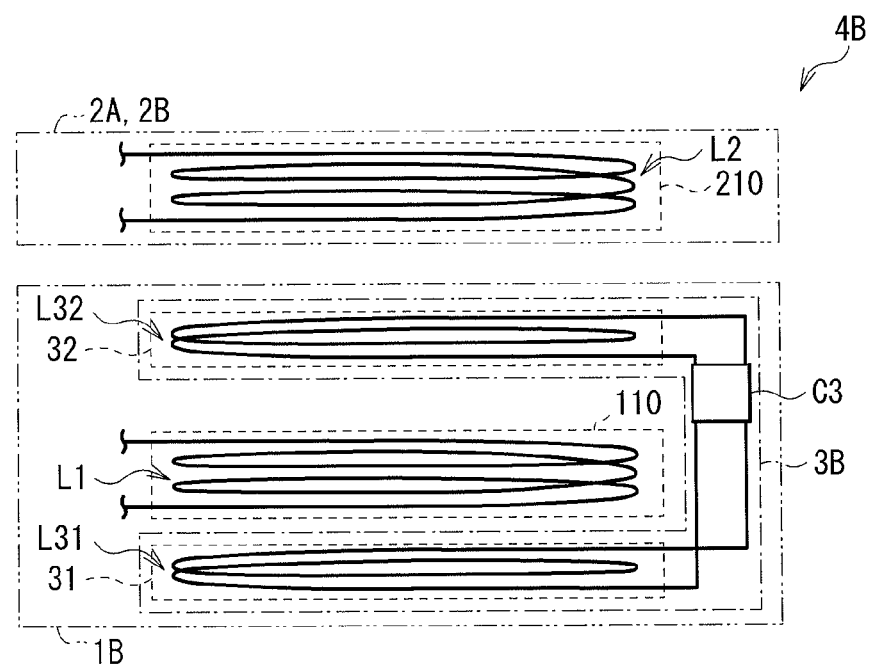
FIG. 16 is a schematic diagram illustrating a schematic configuration example of a feed system according to a third embodiment of the disclosure.

FIG. 16 illustrates a schematic configuration example of a feed system (a feed system 4B) according to a third embodiment. The feed system 4B of the third embodiment is a system performing non-contact power transmission using a magnetic field, similarly to the feed system 4, and includes a feed unit 1B having the power transmission section 110 and a coupling reinforcing section 3B, and the electronic units 2A and 2B.

In the feed system 4B of the third embodiment, the coupling reinforcing section 3B includes the current generation sections 31 and 32, similarly to the coupling reinforcing section 3 of the first embodiment. In addition, similarly to the coupling reinforcing section 3, the power transmission coil L1 is disposed (in a gap) between the current generation sections 31 and 32. Note that the current generation sections 31 and 32 may be disposed (in a gap) between the power transmission coil L1 (the magnetic device) and the power reception coil L2 (the other magnetic device), similarly to the coupling reinforcing section 3A of the second embodiment.

Incidentally, unlike the coupling reinforcing section 3, the coupling reinforcing section 3B further includes a resonance capacitor C3. The resonance capacitor C3 is a capacitor configuring an LC resonator (a resonance circuit), together with the magnetic devices L31 and L32 (the conductive open loop or the conductive open coil) configuring the current generation sections 31 and 32. In other words, in the coupling reinforcing section 3B, a predetermined resonance operation (LC resonance operation) described later is performed.

Figure 17A:
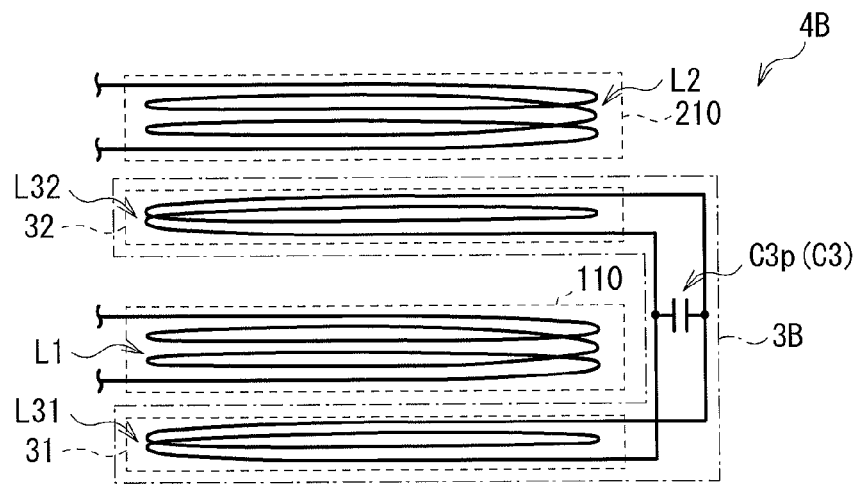
FIGS. 17A to 17C are schematic diagrams each illustrating a detailed configuration example of a resonance capacitor in a coupling reinforcing section illustrated in FIG. 16.
Figure 17B:
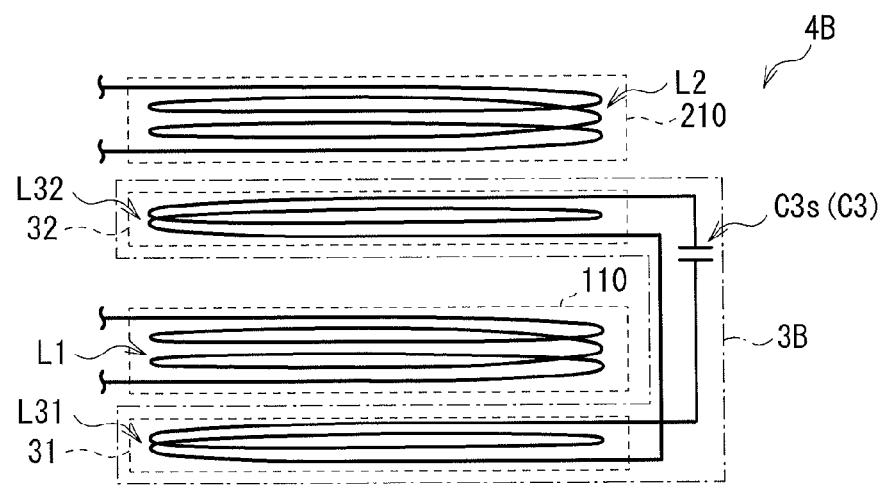
Figure 17C:
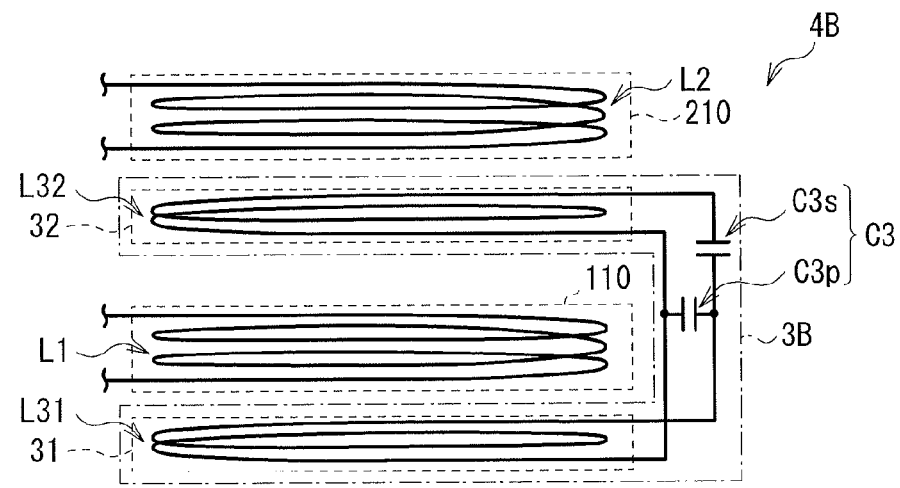

In the example illustrated in FIG. 17A, in the coupling reinforcing section 3B, the magnetic devices L31 and L32 are electrically connected in parallel to a resonance capacitor C3p. In the example illustrated in FIG. 17B, in the coupling reinforcing section 3B, the magnetic devices L31 and L32 are electrically connected in series with a resonance capacitor C3s. Furthermore, in the example illustrated in FIG. 17C, in the coupling reinforcing section 3B, the magnetic devices L31 and L32 are electrically connected in combination of parallel and series to the resonance capacitors C3p and C3s.

In such a way, in the coupling reinforcing section 3B, the resonance operation is performed at a predetermined frequency (a second resonance frequency) f3. In addition, the capacitance value of the resonance capacitor C3 is set to obtain such a resonance frequency f3. However, if the resonance frequency f3 is achieved by resonance operation using a parasitic capacitance component (a floating capacitance component) configured of a line capacitance in the coupling reinforcing section 3B, a capacitance between the coupling reinforcing section 3B and the power transmission section 110 or the power reception section 210, or the like, the resonance capacitor C3 may be omitted.

(Relationship between Resonance Frequencies f1 and f3)

Figure 18:
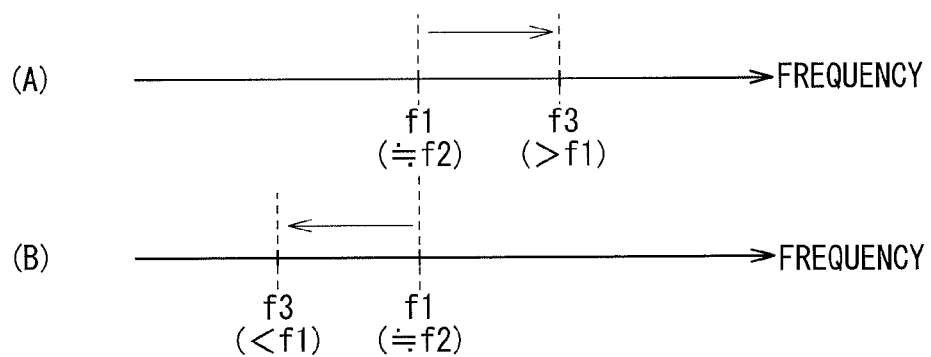
FIG. 18 is a diagram for explaining a relationship between resonance frequencies.

In the embodiment, as illustrated in (A) and (B) of FIG. 18, it is desirable that the resonance frequency f1 ($\approx$f2) in the resonance operation using the power transmission coil L1 in the power transmission be different from the resonance frequency f3 of the LC resonator in the coupling reinforcing section 3B (f1$\neq$f3).

Specifically, as illustrated in (A) of FIG. 18, for example, the resonance frequency f3 is higher than the resonance frequency f1 ($\approx$f2) (f3>f1). Alternatively, as illustrated in (B) of FIG. 18, for example, the resonance frequency f3 is lower than the resonance frequency f1 ($\approx$f2) (f3<f1).

However, depending on the case, the resonance frequency f1 ($\approx$f2) in the resonance operation using the power transmission coil L1 in the power transmission may be substantially equal to the resonance frequency f3 in the LC resonator in the coupling reinforcing section 3B (f1$\approx$f3).

[Function and Effects of Feed System 4B]

In the feed system 4B of the third embodiment, when the coupling reinforcing section 3B resonates at the predetermined frequency f3, the currents I31 and I32 generated from the current generation sections 31 and 32 are increased. As a result, the magnetic flux (the magnetic field lines, the magnetic field) generated near the current generation section 32 is also increased. Therefore, the magnetic coupling between the power transmission section 110 (the power transmission coil L1) and the power reception section 210 (the power reception coil L2) is further enhanced. Accordingly, in the third embodiment, the transmission efficiency (the feeding efficiency) is further improved, compared with the first and second embodiments.

(Example of Third Embodiment)

Figures 19, 20:
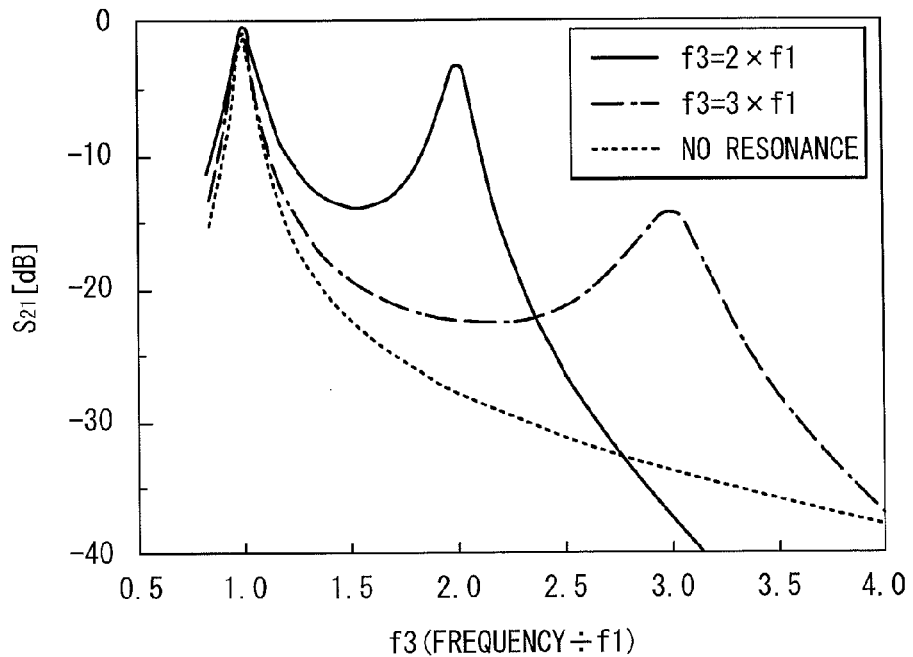
FIG. 19 is a characteristic diagram illustrating an example of data according to Example of the third embodiment.
FIG. 20 is a characteristic diagram illustrating another example of the data according to the Example of the third embodiment.

FIG. 19 and FIG. 20 each illustrate Example of the third embodiment. Also in this Example, various kinds of data illustrated in FIG. 19 and FIG. 20 are acquired by performing electromagnetic field analysis on an analytical model of the coils (the power transmission coil L1, the power reception coil L2, and the magnetic devices L31 and L32) with a perspective structure illustrated in FIG. 9. Note that in the Example, conductive coils having the same shape are used for the power transmission coil L1 and the power reception coil L2, for ease of understanding the phenomenon. In addition, although the resonance capacitor C1 described above is used herein, the resonance capacitor C2 described above is not used, for ease of understanding the phenomenon. In other words, the resonance operation (at the resonance frequency f1) using the power transmission coil L1 and the resonance capacitor C1 is performed in the feed unit 1 while the resonance operation (at the resonance frequency f2) using the power reception coil L2 and the resonance capacitor C2 is not performed in each of the electronic units 2A and 2B.

FIG. 19 illustrates an example of variation in transmission property in the case where the resonance frequency f3 in the coupling reinforcing section 3B is varied. The comparison is made between three cases, namely, the case where the coupling reinforcing section 3B does not resonate (no resonance), the case where the coupling reinforcing section 3B resonates at a frequency of f3=(3×f1), and the case where the coupling reinforcing section 3B resonates at a frequency of f3=(2×f1). Note that, in this case, the value of the resonance capacitor C3 is varied to vary the resonance frequency f3. It is apparent from FIG. 19 that, at the frequency (1×f1) around the resonance frequency f1 in the power transmission, the band width (the width of the frequency band) of $S_{21}$ is increased as the resonance frequency f3 of the coupling reinforcing section 3B is closer to f1 (1×f1). This indicates that the magnetic coupling between the power transmission section 110 (the power transmission coil L1) and the power reception section 210 (the power reception coil L2) is enhanced as the resonance frequency f3 of the coupling reinforcing section 3B is closer to f1 (1×f1).

FIG. 20 is a table of summary of differences in the maximum transmission efficiency in the case where the resonance frequency f3 in the coupling reinforcing section 3B is varied. It is apparent from FIG. 20 that the maximum transmission efficiency is improved by resonance of the coupling reinforcing section 3B at a predetermined frequency. In addition, it is also apparent that the maximum transmission efficiency is increased as the resonance frequency f3 is closer to f1 (1×f1). In theory, the transmission efficiency (the feeding efficiency) is at the maximum when the resonance frequency f3 and the resonance frequency f1 coincide with each other. However, when the frequency deviation occurs between the resonance frequency f3 and the resonance frequency f1, the transmission efficiency (the feeding efficiency) and the impedance of each of the impedance matching circuits 112 and 212 are largely varied. In other words, the transmission efficiency (the feeding efficiency) and the impedance of each of the impedance matching circuits 112 and 212 become sensitive to the degree of the frequency deviation between the resonance frequency f3 and the resonance frequency f1. Therefore, as illustrated in (A) and (B) of FIG. 18, it is desirable that the resonance frequency f1 (≈f2) be different from the resonance frequency f3 (f1≠f3). Moreover, in such a case, although the resonance frequency f3 may be lower or higher than the resonance frequency f1, the resonance frequency f3 is preferably set to be higher than the resonance frequency f1 (f3>f1) in many cases since the value of the resonance capacitor C3 is allowed to be reduced.

As described above, in the third embodiment, the coupling reinforcing section 3B resonates at the predetermined frequency f3. Therefore, the magnetic coupling between the power transmission section 110 (the power transmission coil L1) and the power reception section 210 (the power reception coil L2) is further enhanced. Consequently, the energy loss is allowed to be further decreased (herein, the transmission efficiency (the feeding efficiency) is allowed to be further improved), compared with the first and second embodiments.

[Modifications]

Subsequently, modifications of any of the first to third embodiments will be described. Note that like numerals are used to designate substantially like components of any of the embodiments, and the description thereof will be appropriately omitted.

Figure 21A:
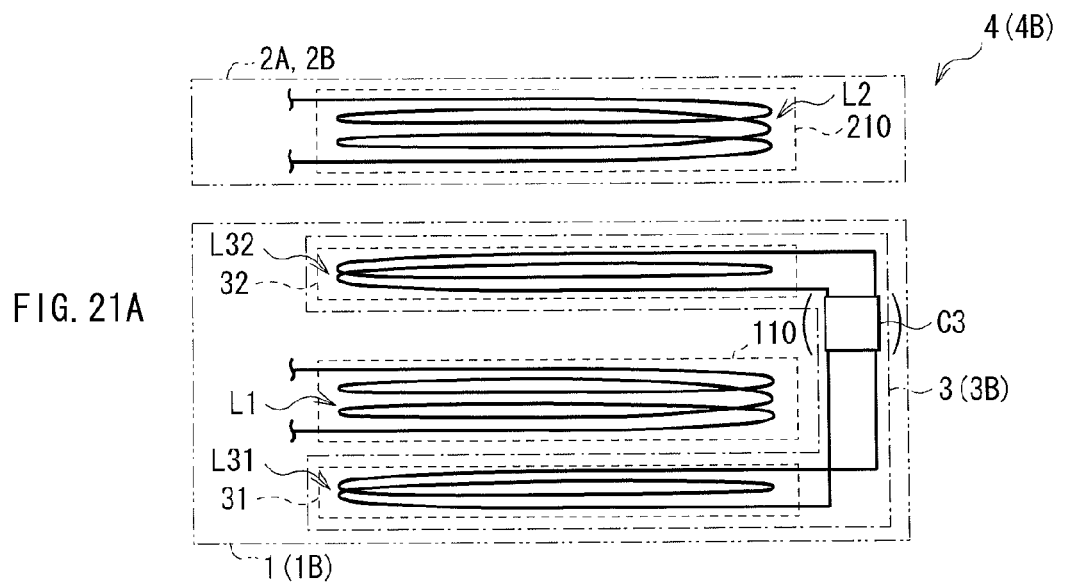
FIGS. 21A and 21B are schematic diagrams each illustrating a schematic configuration example of a feed system according to a modification.
Figure 21B:
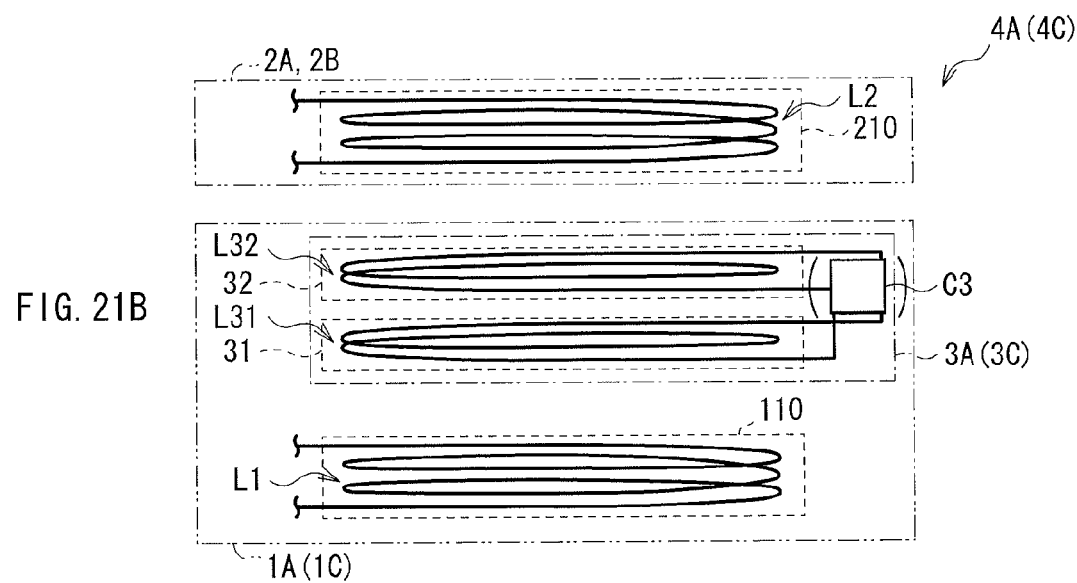

In the first to third embodiments, the descriptions are given of the case where the coupling reinforcing sections 3 and 3A to 3C are provided in the feed units 1 and 1A to 1C as the primary-side units, respectively, as the feed systems 4 and 4A to 4C illustrated in FIGS. 21A and 21B.

Figure 22A:
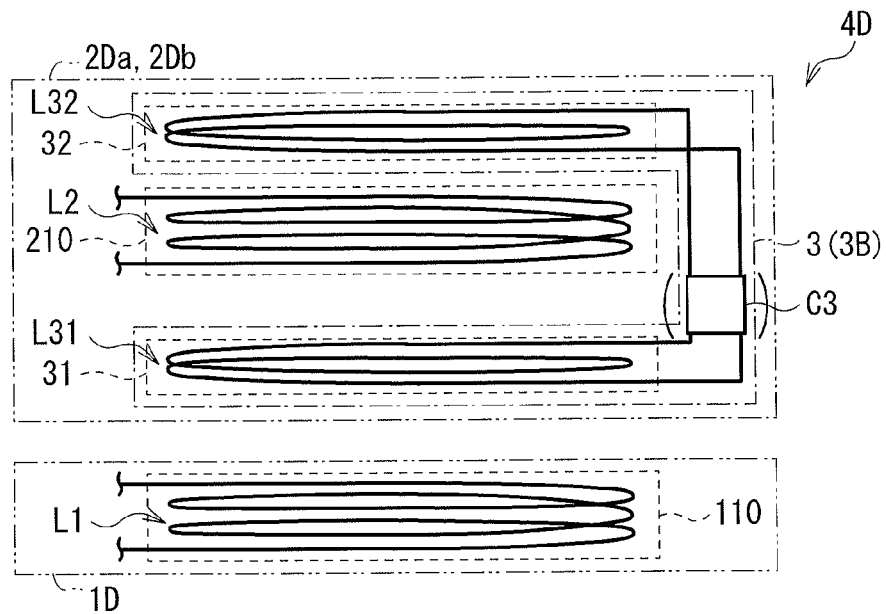
FIGS. 22A and 22B are schematic diagrams each illustrating a schematic configuration example of another feed system according to the modification.
Figure 22B:
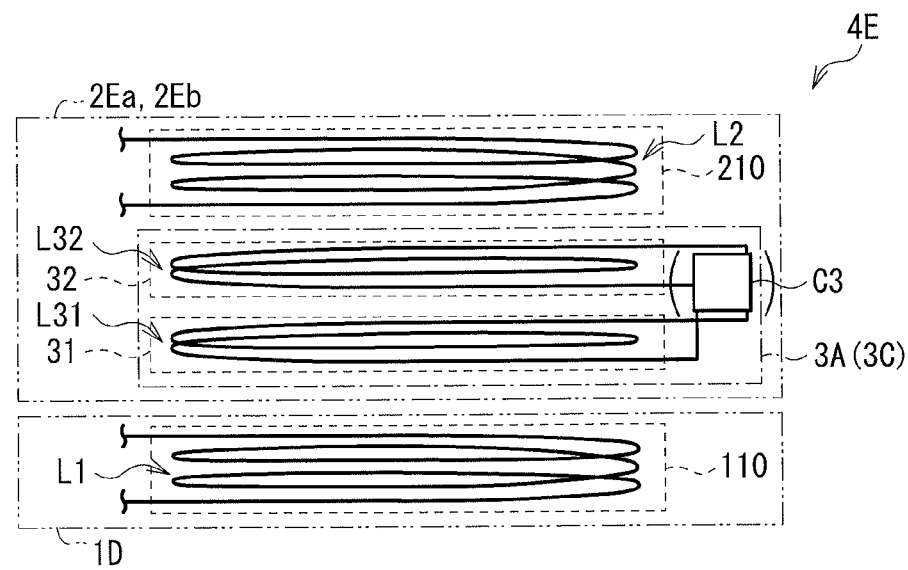

However, this is not limitative, and as feed systems 4D and 4E illustrated in FIGS. 22A and 22B, for example, any of the coupling reinforcing sections 3 and 3A to 3C may be provided in electronic units 2Da and 2Db or electronic units 2Ea and 2Eb as the secondary-side units (units to be fed with power). Note that, in this case, in a feed unit 1D as the primary-side unit, no coupling reinforcing sections 3 and 3A to 3C are provided while the power transmission section 110 is provided.

Moreover, as feed systems 4F and 4G illustrated in FIGS. 23A and 23B, for example, any of the coupling reinforcing sections 3 and 3A to 3C may be provided in the other unit (a reinforce unit 41) which is separated from the feed unit 1D and the electronic units 2A and 2B (the magnetic coupling units).

Specifically, any of the coupling reinforcing sections 3 and 3A to 3C described in the embodiments and the like may be provided in one or more of the feed unit (the primary-side unit), the electronic units (the secondary-side units) as the units to be fed with power, and the other unit (a product) separated from the feed unit and the electronic units (the magnetic coupling units).

[Other Modifications]

Hereinbefore, although the technology of the disclosure has been described with referring to the embodiments and the modifications, the technology is not limited thereto, and various modifications may be made.

For example, in the above-described embodiments and the like, although the description is given of the case where one coupling reinforcing section is provided, this is not limited thereto. For example, a plurality of (two or more) coupling reinforcing sections may be provided. In addition, in the above-described embodiments, although the description is given of only the case where one power transmission coil and one power reception coil are provided, this is not limited thereto. For example, a plurality of (two or more) power transmission coils or a plurality of (two or more) power reception coils may be provided. Furthermore, in the above-described embodiments and the like, although each of the coils (the power transmission coil, the power reception coil, and the magnetic device) has a spiral shape (in a planar shape) or a helical shape formed by winding a wire in a thickness direction thereof, each of the coils may be configured to have an alpha-wound shape formed by folding a spiral coil into two layers or a multilayer spiral shape. In addition, each of the coils may be configured to have a coil shape such as a shape of Arabic numeral 8 and a lattice shape, which is capable of reducing leakage of a magnetic flux. On the other hand, in the power transmission section, in the power reception section, and in the coupling reinforcing section, a magnetic material, a metal material, or the like may be provided to prevent unnecessary leakage of a magnetic flux (magnetic field lines, a magnetic field) or improve transmission efficiency (feeding efficiency). In addition, unlike the above-described embodiments and the like, two current generation sections 31 and 32 may be provided on the same plane. Moreover, a magnetic device such as the power transmission coil and the power reception coil may be provided on the plane same as that provided with one or both of the current generation sections 31 and 32. Furthermore, the case where the magnetic device such as the power transmission coil and the power reception coil is electrically connected (by a wire) to any of the coupling reinforcing section 3 and 3A to 3C, and the connected one of the coupling reinforcing sections 3 and 3A to 3C is used as a part of the magnetic device is also available.

Each of the resonance capacitors (in particular, the resonance capacitor in the coupling reinforcing section) is not limited to the case of using a fixed electrostatic capacitance value, the configuration in which the electrostatic capacitance value is variable (for example, a configuration in which a connection path of a plurality of capacitors is switched by a switch and the like) is also adopted. In such a configuration, control (optimization) of the resonance frequency is achievable through adjustment of the electrostatic capacitance value.

Figure 24:
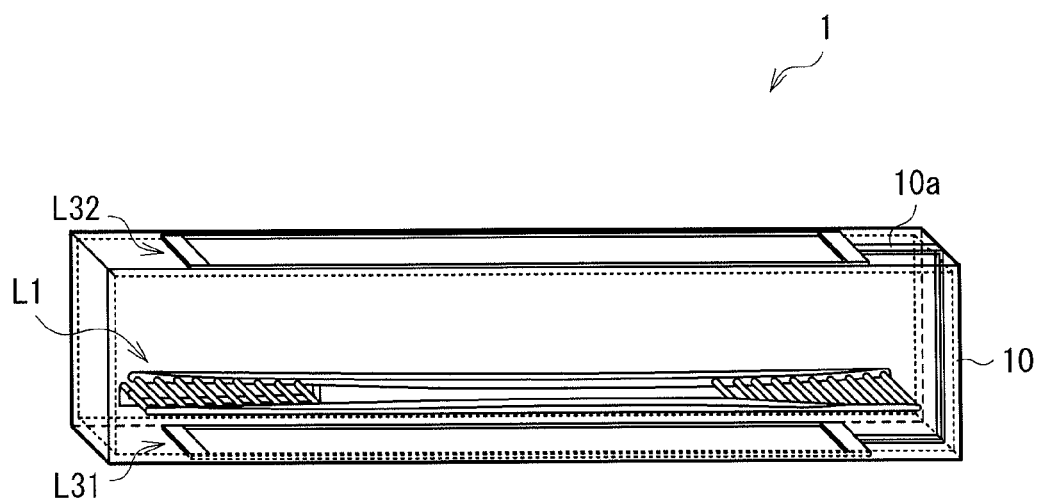
FIG. 24 is a schematic diagram illustrating a schematic configuration example of a feed unit according to another modification.

Furthermore, one or both of the current generation sections 31 and 32 configuring the coupling reinforcing section may be provided on a surface of a housing, in addition to inside of the housing (a case or a container) containing the feed unit, the electronic units (the secondary-side units), and the other unit (a product) separated from the feed unit and the electronic units (the secondary-side units). For example, FIG. 24 illustrates a detailed configuration example (a perspective view) of the feed unit 1 in the case where a metal section (a conductive section) 10a on a surface of a housing 10 is used as the current generation sections 31 and 32 (the magnetic devices L31 and L32). In this case, the coupling reinforcing sections are easily configured through integral formation of a material (such as resin) used mainly for the housing 10 and the metal section 10a on the surface of the housing 10. In addition, at least a part of the coupling reinforcing section may be utilized as a design. On the other hand, as a guide of an arrangement position in the case where the electronic units are placed on the feeding surface of the feed unit, at least a part of the coupling reinforcing section may be used.

In addition, in the above-described embodiments and the like, the components of each of the feed unit, the electronic units, and the like have been described specifically. However, all of the components are not necessarily provided, and alternatively, other components may be further provided. For example, a communication function, a control function, a display function, a function of authenticating a secondary-side unit, a function of determining a secondary-side unit placed on a primary-side unit, a function of detecting a mixture of dissimilar metal, and the like may be mounted in the feed unit (the power transmission unit) and the electronic units (the power reception units).

In addition, in the above-described embodiments and the like, although the description is given of the case where the plurality of (two) electronic units are provided in the feed system, the number of the electronic units is not limited thereto. Alternatively, only one electronic unit may be provided in the feed system.

Furthermore, in the above-described embodiments and the like, a charging tray for a small electronic unit (CE device) such as a mobile phone has been described as an example of the feed unit. However, the feed unit is not limited to such a household charging tray, and is applicable as a charging unit for various electronic units. In addition, the feed unit is not necessarily a tray, and may be a stand for electronic units, such as a so-called cradle. Moreover, in the above-described embodiments, although the electronic unit has been described as an example of a unit to be fed with power, the unit to be fed with power is not limited thereto, and may be other than the electronic unit (for example, vehicles such as electric cars).

In addition, in the above-described embodiments and the like, although a non-contact feed system has been described as an example of the magnetic coupling system of the disclosure, this is not limited thereto. In other words, the magnetic coupling system of the disclosure and a plurality of magnetic coupling units configuring the magnetic coupling system are widely applicable to electronic components and units which use magnetic coupling between magnetic devices, as well as a system which uses such electronic components and units. For example, the magnetic coupling system of the disclosure and the plurality of magnetic coupling units configuring the magnetic coupling system are applicable to a communication system performing local wireless communication with electronic units, non-contact IC cards, and the like (a local wireless communication system), an induction heating system heating metal products without contact, a transformation system (a transformer) converting a voltage value of an AC power into a different voltage value, and the like. In particular, in the case of the induction heating system, the secondary-side units (the electronic units) including the power reception section (the power reception coil) according to the embodiments and the like may be replaced by metal products (such as metal pots), and the transmission efficiency (the feeding efficiency) is replaced by heat efficiency.

Note that the technology may be configured as follows.

(1) A magnetic coupling unit including:
one or more magnetic devices each capable of being magnetically coupled with other magnetic device in other unit; and
one or more coupling reinforcing sections each reinforcing the magnetic coupling.

(2) The magnetic coupling unit according to (1), wherein the coupling reinforcing section includes a first current generation section and a second current generation section electrically connected to each other, and
a flowing direction of a first current generated in the first current generation section is opposite to a flowing direction of a second current generated in the second current generation section.

(3) The magnetic coupling unit according to (2), wherein an amount of the first current is larger than an amount of the second current.

(4) The magnetic coupling unit according to (3), wherein a distance between the first current generation section and each of the magnetic devices is smaller than a distance between the second current generation section and each of the magnetic devices.

(5) The magnetic coupling unit according to any one of (2) to (4), wherein each of the magnetic devices is disposed between the first current generation section and the second current generation section.

(6) The magnetic coupling unit according to any one of (2) to (4), wherein each of the first current generation section and the second current generation section is disposed to be located between the magnetic device and the other magnetic device.

(7) The magnetic coupling unit according to any one of (2) to (6), wherein each of the first current generation section and the second current generation section includes an open coil or an open loop.

(8) The magnetic coupling unit according to any one of (1) to (7), wherein each of the coupling reinforcing sections performs a resonance operation.

(9) The magnetic coupling unit according to (8), wherein a first resonance frequency in a resonance operation using the magnetic device at the time when an operation is performed with use of the magnetic coupling is different from a second resonance frequency in the resonance operation in the coupling reinforcing section.

(10) The magnetic coupling unit according to (9), wherein the second resonance frequency is higher than the first resonance frequency.

(11) The magnetic coupling unit according to (9), wherein the second resonance frequency is lower than the first resonance frequency.

(12) The magnetic coupling unit according to (8), wherein a first resonance frequency in a resonance operation using the magnetic device at the time when an operation is performed with use of the magnetic coupling is substantially equal to a second resonance frequency in a resonance operation in the coupling reinforcing section.

(13) The magnetic coupling unit according to any one of (1) to (12), wherein each of the magnetic devices is electrically insulated from the coupling reinforcing sections.

(14) The magnetic coupling unit according to any one of (1) to (13), wherein the magnetic coupling unit is configured as a feed unit with a power transmission section, the power transmission section including the magnetic device as a power transmission coil, and the other magnetic device is provided in a power reception section in a unit to be fed with power as the other unit.

(15) The magnetic coupling unit according to any one of (1) to (13), wherein the other magnetic device is provided in a power transmission section in a feed unit as the other unit, and the magnetic coupling unit is configured as a unit to be fed with power including a power reception section, the power reception section including the magnetic device as a power reception coil.

(16) The magnetic coupling unit according to (15), wherein the unit to be fed with power is an electronic unit.

(17) A magnetic coupling system including a plurality of magnetic coupling units, each of the magnetic coupling units including one or more magnetic devices, wherein the magnetic device in one of the magnetic coupling units is allowed to be magnetically coupled with the magnetic device in one of the remaining magnetic coupling units, and one or more coupling reinforcing sections each reinforcing the magnetic coupling are provided in one or more of the magnetic coupling units and other unit, the other unit being separated from the magnetic coupling units.

(18) The magnetic coupling system according to (17), wherein the coupling reinforcing section is provided in a reinforce unit as the other unit.

(19) The magnetic coupling system according to (17) or (18), wherein the plurality of magnetic coupling units includes a feed unit with a power transmission section and one or more units to be fed with power, the power transmission section including the magnetic device as a power transmission coil, each of the units to be fed with power including a power reception section, and the power reception section including the magnetic device as a power reception coil, and the magnetic coupling system is configured as a feed system performing power transmission with use of a magnetic field.

The present application contains subject matter related to that disclosed in Japanese Priority Patent Application JP 2011-244319 filed in the Japan Patent Office on Nov. 8, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A magnetic coupling unit comprising:
one or more first magnetic devices each capable of being magnetically coupled with a second magnetic device in another magnetic coupling unit; and
one or more coupling reinforcing sections
include a first current generation section and a second current generation section electrically connected to each other, and
wherein a flowing direction of a first current generated in the first current generation section is opposite to a flowing direction of a second current generated in the second current generation section,
wherein a number of windings of a magnetic device of the second current generation section is more than a number of windings of a magnetic device of the first current generation section, and
wherein an amount of the first current is larger than an amount of the second current, and a difference between the amount of the first current and the amount of the second current reinforce magnetic coupling.

2. The magnetic coupling unit according to claim 1, wherein a distance between the first current generation section and each of the one or more first magnetic devices is smaller than a distance between the second current generation section and each of the one or more first magnetic devices.

3. The magnetic coupling unit according to claim 1, wherein each of the one or more first magnetic devices is disposed between the first current generation section and the second current generation section.

4. The magnetic coupling unit according to claim 1, wherein each of the first current generation section and the second current generation section is disposed to be located between the one or more first magnetic devices and the second magnetic device.

5. The magnetic coupling unit according to claim 1, wherein each of the first current generation section and the second current generation section includes an open coil or an open loop.

6. The magnetic coupling unit according to claim 1, wherein each of the one or more coupling reinforcing sections performs a resonance operation.

7. The magnetic coupling unit according to claim 6, wherein a first resonance frequency in a resonance operation using the one or more first magnetic devices in an event an operation is performed with use of the magnetic coupling is different from a second resonance frequency in the resonance operation in the one or more coupling reinforcing sections.

8. The magnetic coupling unit according to claim 7, wherein the second resonance frequency is higher than the first resonance frequency.

9. The magnetic coupling unit according to claim 7, wherein the second resonance frequency is lower than the first resonance frequency.

10. The magnetic coupling unit according to claim 6, wherein a first resonance frequency in a resonance operation using the one or more first magnetic devices in an event an operation is performed with use of the magnetic coupling is substantially equal to a second resonance frequency in a resonance operation in the one or more coupling reinforcing sections.

11. The magnetic coupling unit according to claim 1, wherein each of the one or more first magnetic devices is electrically insulated from the one or more coupling reinforcing sections.

12. The magnetic coupling unit according to claim 1, wherein the magnetic coupling unit is configured as a feed unit with a power transmission section, the power transmission section including the one or more first magnetic devices as a power transmission coil, and the second magnetic device is provided in a power reception section in the other magnetic coupling unit.

13. The magnetic coupling unit according to claim 1, wherein the second magnetic device is provided in a power transmission section in a feed unit as the other magnetic coupling unit, and the magnetic coupling unit is configured as a unit to be fed with power including a power reception section, the power reception section including the one or more first magnetic devices as a power reception coil.

14. The magnetic coupling unit according to claim 13, wherein the other magnetic coupling unit to be fed with power is an electronic unit.

15. A magnetic coupling system comprising:

a plurality of magnetic coupling units, each of the plurality of magnetic coupling units including one or more magnetic devices, wherein the one or more magnetic devices in one of the plurality of magnetic coupling units is allowed to be magnetically coupled with the one or more magnetic devices in one of remaining magnetic coupling units; and one or more coupling reinforcing sections are provided in one or more of: the plurality of magnetic coupling units and an external unit, the external unit being separated from the plurality of magnetic coupling units, wherein the one or more coupling reinforcing sections include a first current generation section and a second current generation section electrically connected to each other, and wherein a flowing direction of a first current generated in the first current generation section is opposite to a flowing direction of a second current generated in the second current generation section, wherein a number of windings of a magnetic device of the second current generation section is more than a number of windings of a magnetic device of the first current generation section, and wherein an amount of the first current is larger than an amount of the second current, and a difference between the amount of the first current and the amount of the second current reinforce magnetic coupling.

16. The magnetic coupling system according to claim 15, wherein the external unit is a reinforce unit, and wherein the one or more coupling reinforcing sections are provided in the reinforce unit.

17. The magnetic coupling system according to claim 15, wherein the plurality of magnetic coupling units includes a feed unit with a power transmission section and one or more units to be fed with power, the power transmission section including the one or more magnetic devices as a power transmission coil, each of the one or more units to be fed with power including a power reception section, and the power reception section including the one or more magnetic devices as a power reception coil, and the magnetic coupling system is configured as a feed system performing power transmission with use of a magnetic field.

\* \* \* \* \*